US012219329B2

(12) United States Patent
Lai et al.

(10) Patent No.: US 12,219,329 B2
(45) Date of Patent: Feb. 4, 2025

(54) BEAMFORMING METHOD AND MICROPHONE SYSTEM IN BOOMLESS HEADSET

(71) Applicant: British Cayman Islands Intelligo Technology Inc., Grand Cayman (KY)

(72) Inventors: Hsueh-Ying Lai, Zhubei (TW); Chih-Sheng Chen, Zhubei (TW); Hua-Jun Hong, Zhubei (TW); Chien Hua Hsu, Zhubei (TW); Tsung-Liang Chen, Zhubel (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 228 days.

(21) Appl. No.: 18/082,224

(22) Filed: Dec. 15, 2022

(65) Prior Publication Data

US 2024/0205597 A1 Jun. 20, 2024

(51) Int. Cl.
*H04R 3/00* (2006.01)
*H04R 1/10* (2006.01)

(52) U.S. Cl.
CPC .......... *H04R 3/005* (2013.01); *H04R 1/1008* (2013.01); *H04R 2410/01* (2013.01); *H04R 2430/20* (2013.01)

(58) Field of Classification Search
CPC .. H04R 3/005; H04R 1/1008; H04R 2410/01; H04R 2430/20; H04R 1/32; H04R 1/326;
(Continued)

(56) References Cited

U.S. PATENT DOCUMENTS

2011/0129097 A1* 6/2011 Andrea ................ G10K 11/175
381/370
2012/0020485 A1* 1/2012 Visser .................... H04R 5/033
381/57

(Continued)

FOREIGN PATENT DOCUMENTS

CN 114610214 A 6/2022
TW M617940 U 10/2021

(Continued)

OTHER PUBLICATIONS

Choi, Hyeong-Seok et al., "Phase-aware Speech Enhancement with Deep Complex U-Net", a conference paper at ICRL 2019, 2019, pp. 1-20.

(Continued)

*Primary Examiner* — Mark Fischer
(74) *Attorney, Agent, or Firm* — MUNCY, GEISSLER, OLDS & LOWE, P.C.

(57) ABSTRACT

A microphone system for a boomless headset is disclosed, comprising a microphone array and a processing unit. The microphone array comprises Q microphones and generates Q audio signals. A first microphone and a second microphone are disposed on different earcups, and a third microphone is disposed on one of two earcups and displaced laterally and vertically from one of the first and the second microphones. The processing unit performs operations comprising: performing spatial filtering over the Q audio signals using a trained model based on an arc line with a vertical distance and a horizontal distance from a midpoint between the first and the second microphones, a time delay range for the first and the second microphones and coordinates of the Q microphones to generate a beamformed output signal originated from zero or more target sound sources inside a target beam area, where Q>=3.

22 Claims, 22 Drawing Sheets

(58) Field of Classification Search
CPC ........ H04R 1/40; H04R 1/406; H04R 29/005; H04R 2201/40; H04R 2201/401; H04R 2201/403; H04R 2201/405; H04R 2430/21; H04R 2430/23; G10L 2021/02165; G10L 2021/02166; G10K 2210/1081; G10K 2210/1082; G10K 2210/111; G10K 2210/3215
See application file for complete search history.

(56) References Cited

U.S. PATENT DOCUMENTS

| | | | | |
|---|---|---|---|---|
| 2015/0172807 | A1* | 6/2015 | Olsson | G10L 21/0208 381/74 |
| 2023/0007398 | A1 | 1/2023 | Carrigan | |

FOREIGN PATENT DOCUMENTS

| | | | |
|---|---|---|---|
| TW | 202247142 | A | 12/2022 |
| WO | WO 2022/234406 | A1 | 11/2022 |

OTHER PUBLICATIONS

U.S. Appl. No. 17/895,980, filed Aug. 25, 2022.
U.S. Appl. No. 17/974,323, filed Oct. 26, 2022.

* cited by examiner

Layout 1A

Layout 1B

BEAMFORMING METHOD AND MICROPHONE SYSTEM IN BOOMLESS HEADSET

BACKGROUND OF THE INVENTION

Field of the Invention

The invention relates to audio processing, and more particularly, to a beamforming method and a microphone system in a boomless headset (also called a boomfree headset) able to do away with a boom microphone and provide best speech quality.

Description of the Related Art

For applications that require speech interaction, we often choose a boom microphone headset. A boom microphone is when the microphone is attached to the end of a boom, allowing perfect positioning in front of or next to the user's mouth. This option provides the most accurate and best-quality sound that is possible for software. The advantage of a boom microphone headset is it moves with the user. If the users turn their heads, the boom microphones remain in perfect position to continuously pick up their voices. However, the boom microphone headset has many disadvantages. For example, the boom microphone is usually the easiest part of a headset to break, as it's a flexible piece that if mishandled can break off or snap from the boom swivel. Another disadvantage is that the user must continually and manually adjust the boom to the front of his mouth in order to get proper recording, which usually causing annoyance.

Accordingly, what is needed is a microphone system for use in a boomless headset so as to do away with the boom microphone and provide best speech quality. The invention addresses such a need.

SUMMARY OF THE INVENTION

In view of the above-mentioned problems, an object of the invention is to provide a microphone system for use in a boomless headset so as to do away with the boom microphone and provide best speech quality.

One embodiment of the invention provides a microphone system applicable to a boomless headset with two earcups. The microphone system comprises a microphone array and a processing unit. The microphone array comprises Q microphones that detect sound and generate Q audio signals. A first microphone and a second microphone of the Q microphones are disposed on different earcups, and a third microphone of the Q microphones is disposed on one of the two earcups and displaced laterally and vertically from one of the first and the second microphones. The processing unit is configured to perform a set of operations comprising: performing spatial filtering over the Q audio signals using a trained model based on an arc line with a vertical distance and a horizontal distance from a first midpoint between the first and the second microphones, a main time delay range for the first and the second microphones and coordinates of the Q microphones to generate a beamformed output signal originated from zero or more target sound sources inside a target beam area, where Q>=3. The TBA is a collection of intersection planes of multiple surfaces and multiple cones. The multiple surfaces correspond to multiple main time delays within the main time delay range, and angles of the multiple cones are related to multiple intersection points of the multiple surfaces and the arc line. The multiple surfaces extend from the first midpoint, and the multiple cones extend from a second midpoint between the third microphone and the one of the first and the second microphones.

Another embodiment of the invention provides a beamforming method applicable to a boomless headset comprising two earcups and a microphone array. The method comprises: disposing a first microphone and a second microphone of Q microphones in the microphone array on different earcups; disposing a third microphone of the Q microphones on one of the two earcups, wherein the third microphone is displaced laterally and vertically from one of the first and the second microphones; detecting sound by the Q microphones to generate Q audio signals; and, performing spatial filtering over the Q audio signals using a trained model based on an arc line with a vertical distance and a horizontal distance from a first midpoint between the first and the second microphones, a main time delay range for the first and the second microphones and coordinates of the Q microphones to generate a beamformed output signal originated from zero or more target sound sources inside a target beam area (TBA), where Q>=3. The TBA is a collection of intersection planes of multiple surfaces and multiple cones. The multiple surfaces correspond to multiple main time delays within the main time delay range, and angles of the multiple cones are related to multiple intersection points of the multiple surfaces and the arc line. The multiple surfaces extend from the first midpoint, and the multiple cones extend from a second midpoint between the third microphone and the one of the first and the second microphones.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
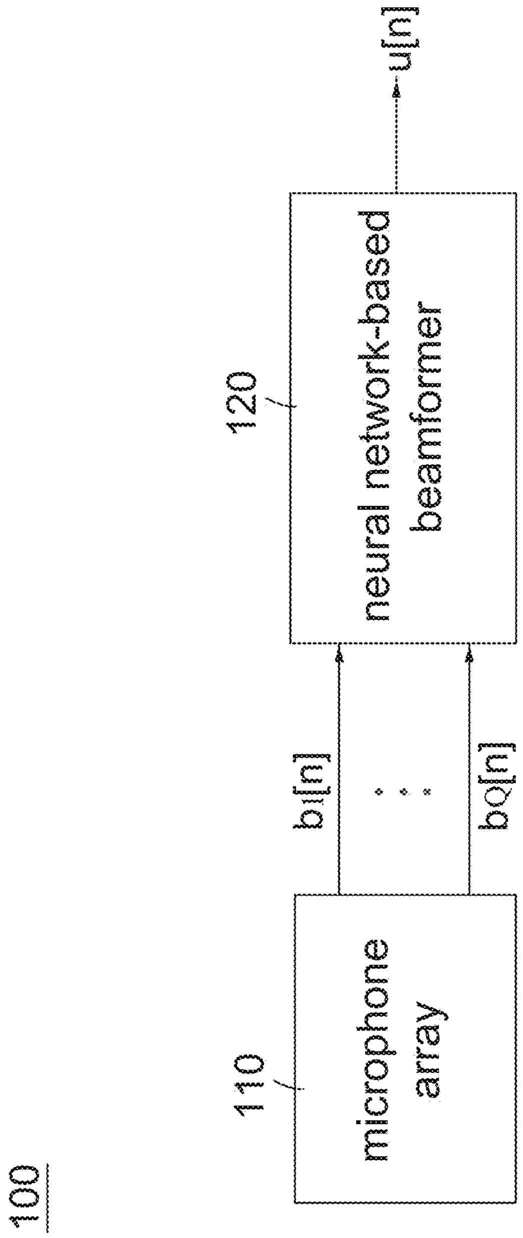
FIG. 1 is schematic diagram of a microphone system according to the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

FIG. 1 is schematic diagram of a microphone system according to the invention. Referring to FIG. 1, a microphone system 100 of the invention, applicable to a boomless headset, includes a microphone array 110 and a neural network-based beamformer 120. The microphone array 110 includes Q microphones 111~11Q configured to detect sound to generate Q audio signals $b_1[n]$~$b_Q[n]$, where Q>=3. The neural network-based beamformer 120 is used to perform spatial filtering operation with or without denoising operation over the Q audio signals received from the microphone array 110 using a trained model (e.g., a trained neural network 760T in FIGS. 7C-7D) based on a predefined arc line AL with a vertical distance ht and a horizontal distance dt from a reference center (e.g., the midpoint A1 of two microphones 111-112), a main time delay range of a lower limit $TS_{12}$ to a upper limit $TE_{12}$ for the two microphones 111-112 and a set M of microphone coordinates of the microphone array 110 to generate a clean/noisy beamformed output signal u[n] originated from zero or more target sound sources inside a target beam area (TBA) (will be described below), where n denotes the discrete time index, 40 cm<=d<=100 cm and ht<=10 cm.

The Q microphones 111-11Q in the microphone array 110 may be, for example, omnidirectional microphones, bi-directional microphones, directional microphones, or a combination thereof. Please note that when directional or bi-directional microphones are included in the microphone array 110, a circuit designer needs to ensure the directional or bi-directional microphones are capable of receiving all the audio signal originated from all target sound sources (Ta) inside the TBA.

Figure 2A:
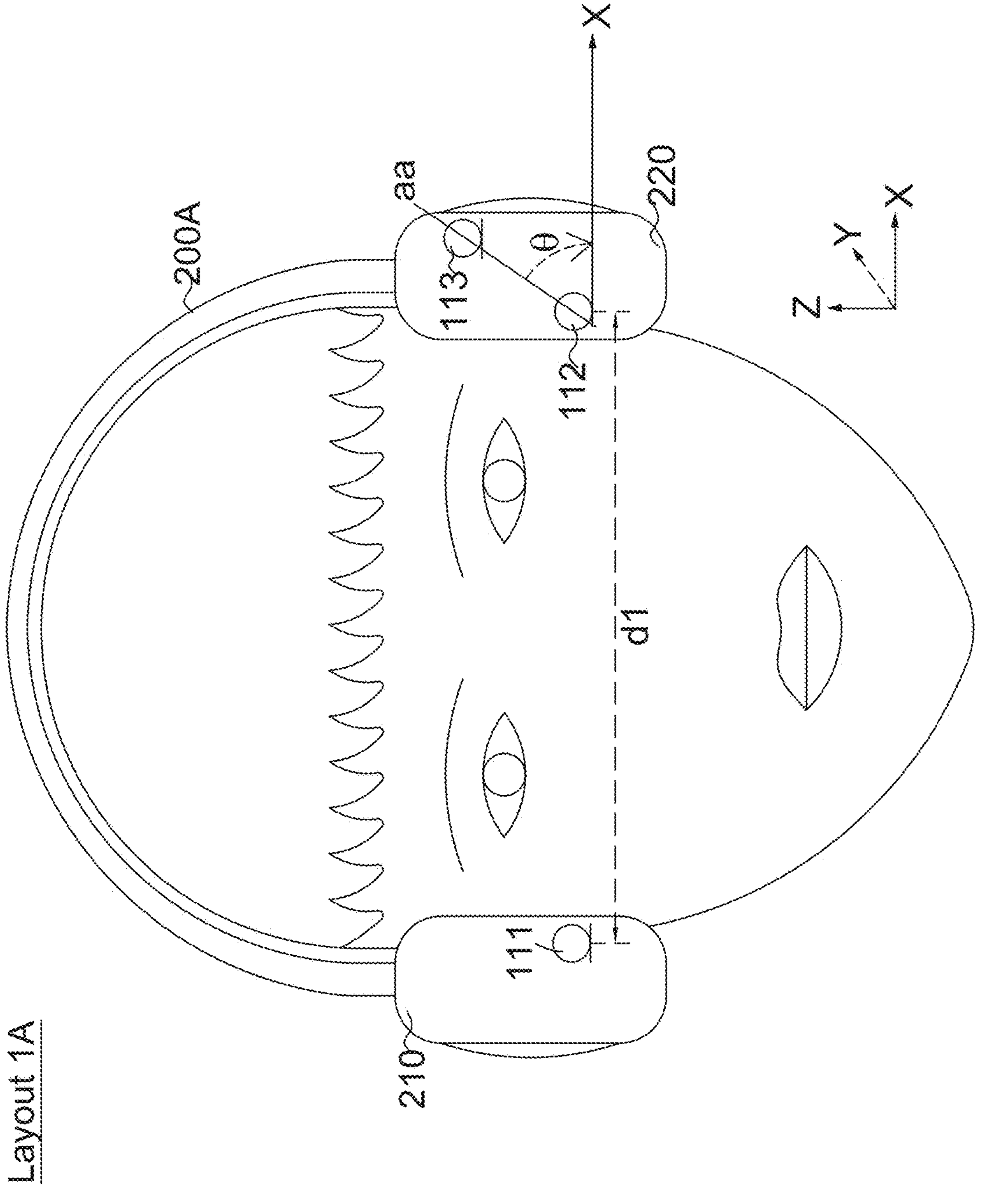
FIG. 2A is a conceptual diagram of a person wearing a boomless headset 200A with the microphone system 100 according to Layout 1A.
Figure 2B:
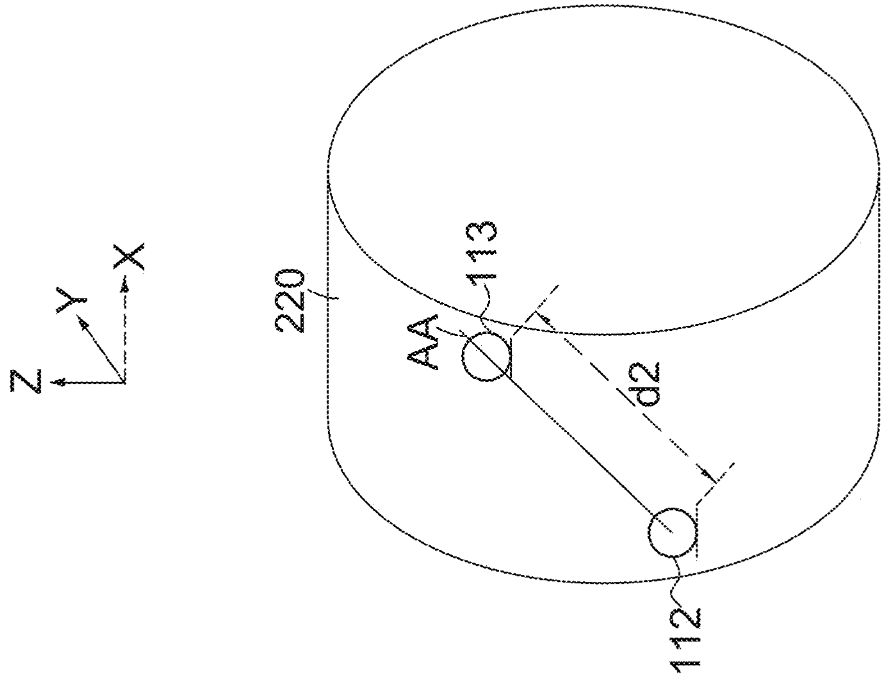
FIGS. 2B~2C respectively show different side views of the two microphones 112 and 113 on the earcup 220 based on FIG. 2A.
Figure 2C:
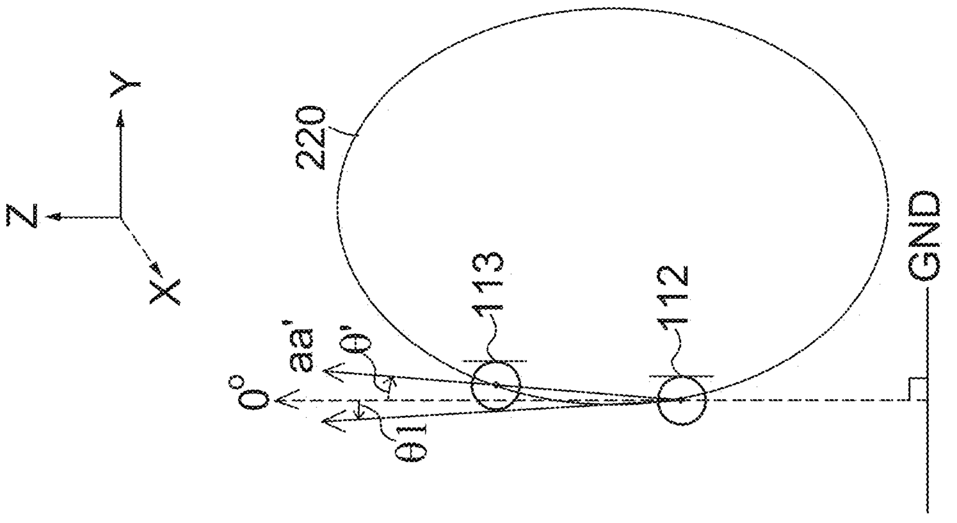
Figure 2D:
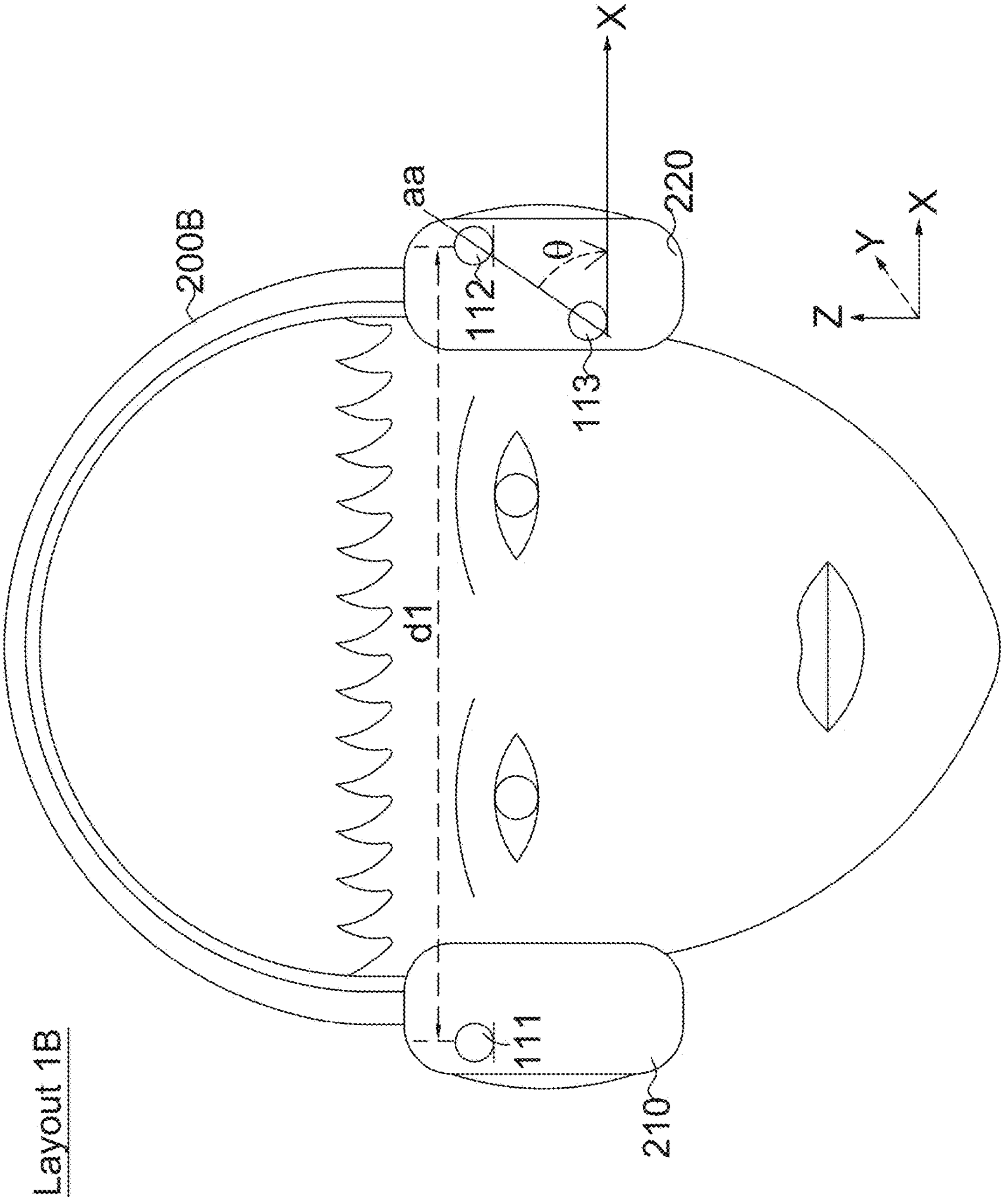
FIG. 2D is a conceptual diagram of a person wearing a boomless headset 200B with the microphone system 100 according to Layout 1B.
Figure 2E:
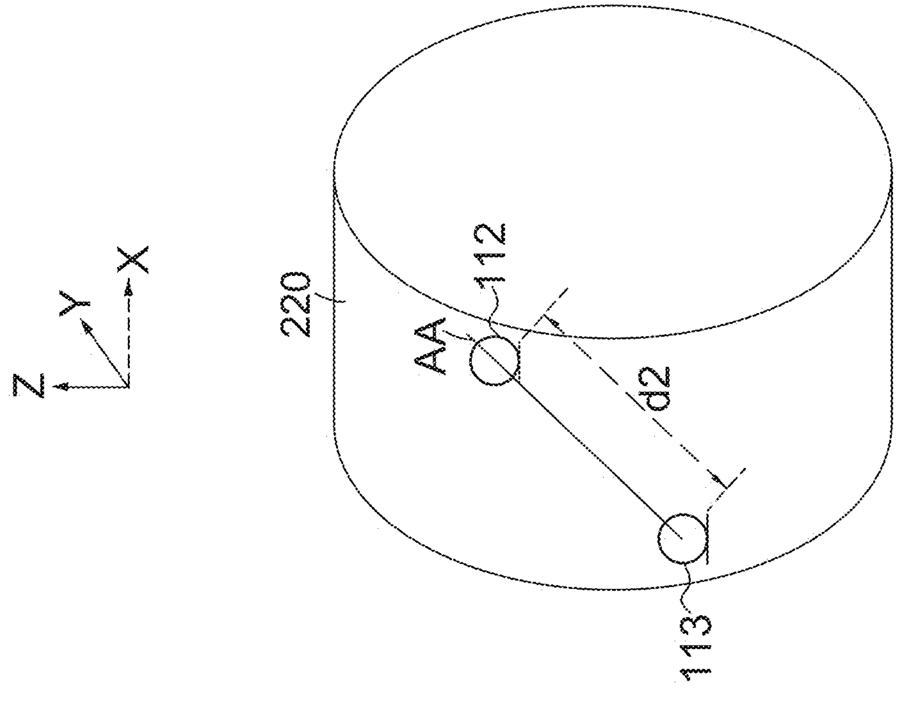
FIGS. 2E~2F respectively show different side views of the two microphones 112 and 113 on the earcup 220 based on FIG. 2D.
Figure 2F:
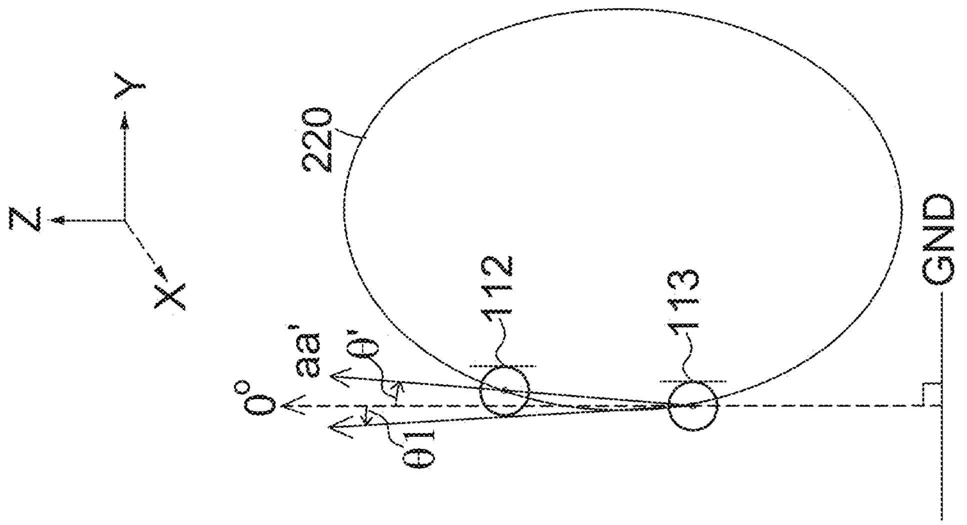
Figure 2G:
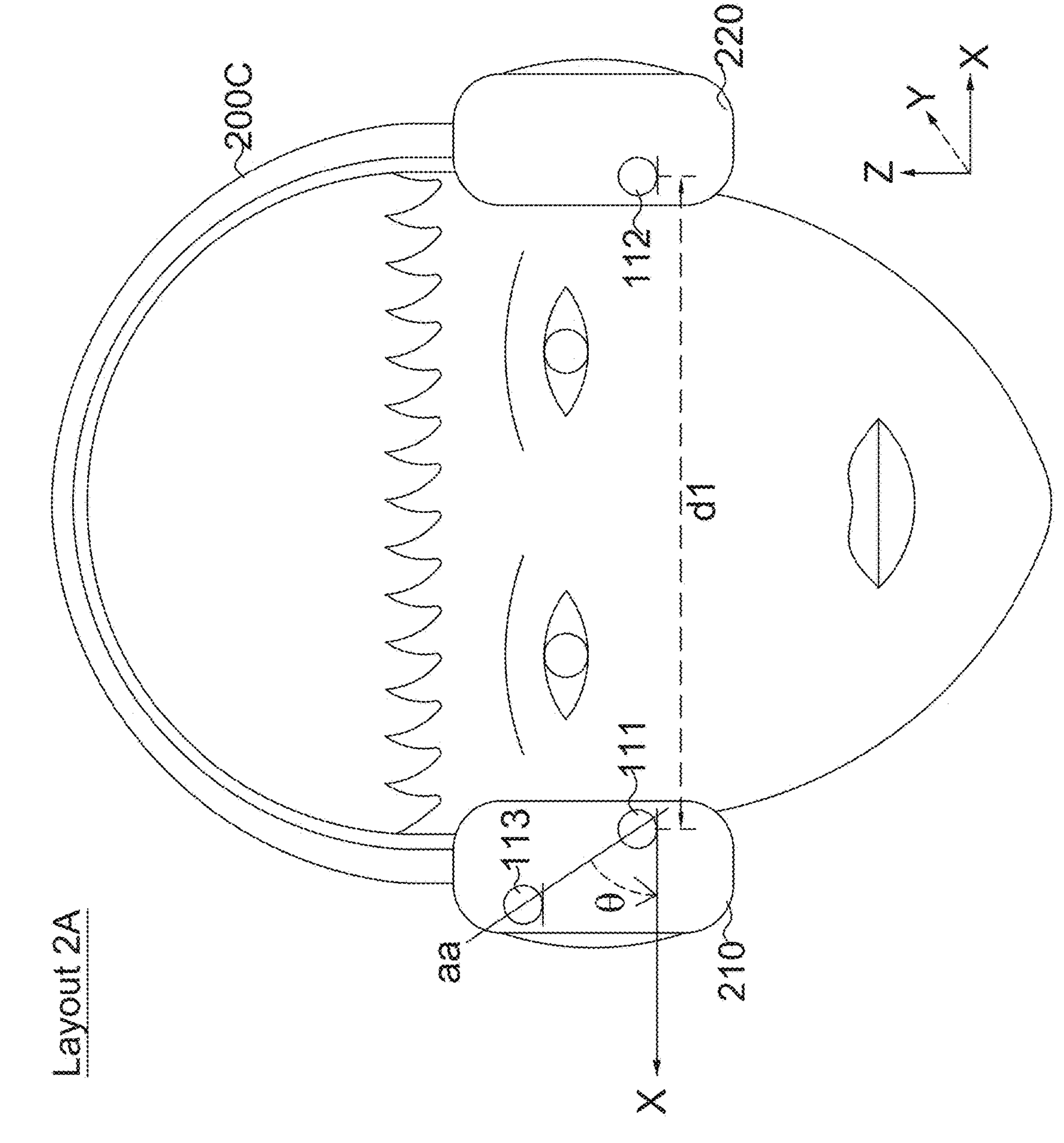
FIG. 2G is a conceptual diagram of a person wearing a boomless headset 200C with the microphone system 100 according to Layout 2A.
Figure 2H:
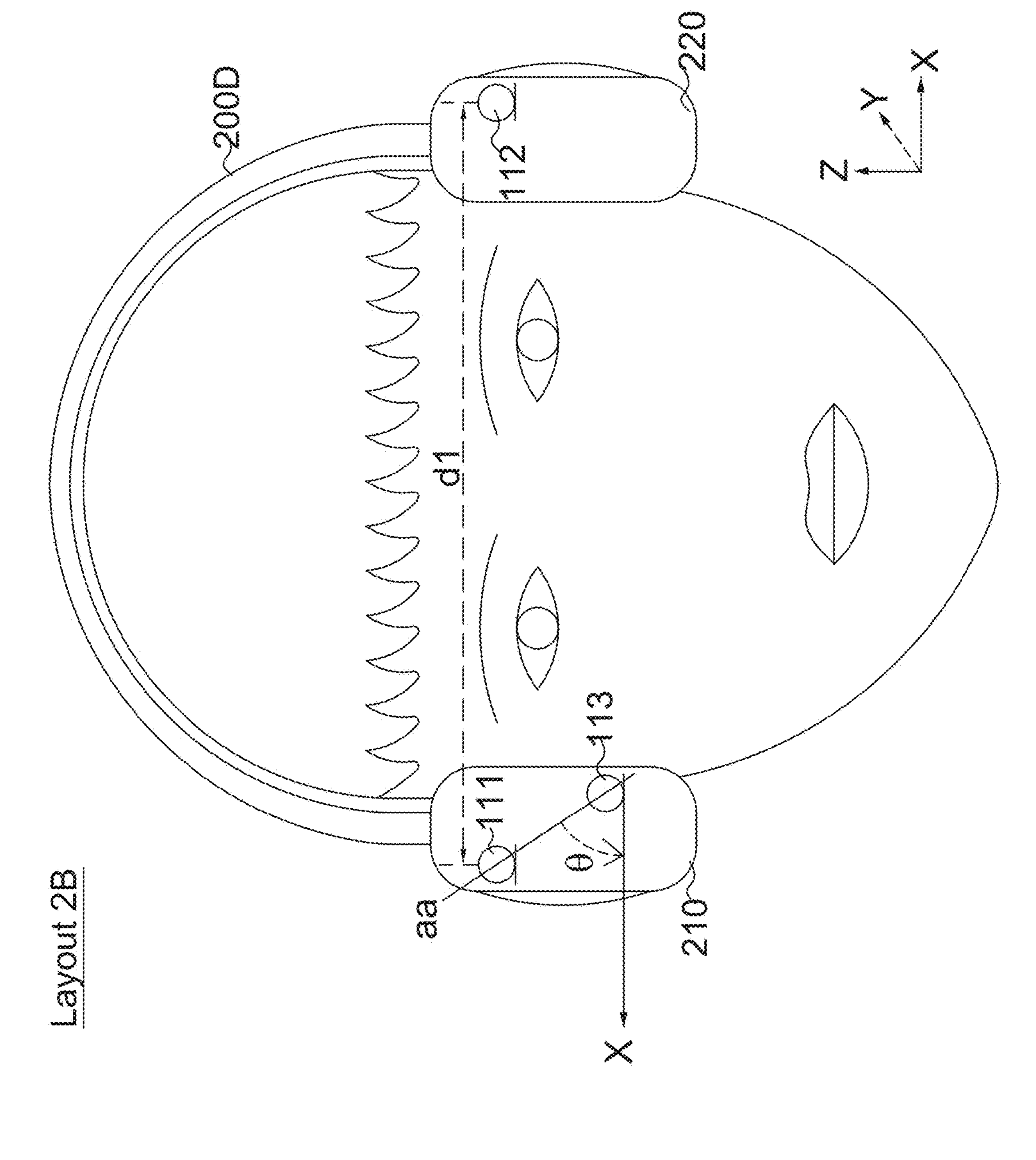
FIG. 2H is a conceptual diagram of a person wearing a boomless headset 200D with the microphone system 100 according to Layout 2B.

FIGS. 2A, 2D, 2G-2H are conceptual diagrams of a person wearing a boomless headset 200A/B/C/D with the microphone system 100 according to Layout 1A/1B/2A/2B. Referring to FIGS. 2A, 2D, 2G-2H, three microphones 111~113 are respectively disposed on the two speaker earcups 210 and 220 of the boomless headset 200A/B/C/D. The boomless headset 200 A/B/C/D makes talking more natural. Since the user doesn't have a microphone boom in front of his mouth, he can just talk and in the meantime, the microphones 111~113 on the earcups 210 and 220 receive his speech. In the examples of FIGS. 2A and 2D, one microphone 111 is disposed on the right earcup 210 while two microphones 112~113 are disposed on the left earcup 220. The microphone 113 is displaced outward and upward from the microphone 112 (called "Layout 1A") in FIG. 2A while the microphone 113 is displaced inward and downward from the microphone 112 (called "Layout 1B") in FIG. 2D. In the examples of FIGS. 2G and 2H, two microphones 111 and 113 are disposed on the right earcup 210 while one microphone 112 is disposed on the left earcup 220. The microphone 113 is displaced outward and upward from the microphone 111 (called "Layout 2A") in FIG. 2G while the microphone 113 is displaced inward and downward from the microphone 111 (called "Layout 2B") in FIG. 2H. Please note that the side views of the two microphones 111 and 113 on the right earcup 210 for Layout 2A are analogous to those of the two microphones 112 and 113 on the left earcup 220 for Layout 1A as shown in FIGS. 2B and 2C; the side views of the two microphones 111 and 113 on the right earcup 210 for Layout 2B are analogous to those of the two microphones 112 and 113 on the left earcup 220 for Layout 1B as shown in FIGS. 2E and 2F; thus, the descriptions of the side views of the two microphones 111 and 113 on the right earcup 210 for Layout 2A and 2B are omitted herein. When Q>3, the locations of the other microphones 114~11Q are not limited. For purposes of clarity and ease of description, the following examples and embodiments are described with reference to Layout 1A in FIGS. 2A-2C. However, the principles presented for Layout 1A are fully applicable to Layout 1B, 2A and 2B as well.

Referring to FIG. 2A, the horizontal distance d1 between the microphones 111 and 112 along x axis ranges from 12 cm to 24 cm. The microphone 113 is displaced outward and upward from the microphone 112 for Layout 1A so that the two microphones 112 and 113 are not disposed on the yz-plane. Referring to FIGS. 2A-2B, a line AA going through the two microphones 112 and 113 is projected on the xz-plane to form a projected line aa, and then the projected line aa and the x axis form an angle θ ranging from 30 degrees to 60 degrees. The three-dimensional (3D) distance d2 between the two microphones 112 and 113 is greater than or equal to 1 cm. FIGS. 2B~2C respectively show different side views of the two microphones 112 and 113 on the earcup 220 based on FIG. 2A. The line AA going through the two microphones 112 and 113 is projected on the yz-plane to form a projected line aa', and then the projected line aa' and the z axis (or 0-degree line) form an angle ranging from θ1 to θ', where −10°<=θ1<=0 and 0<=θ'<=+45°.

Through the specification and claims, the following notations/terms take the meanings explicitly associated herein, unless the context clearly dictates otherwise. The term "sound source" refers to anything producing audio information, including people, animals, or objects. Moreover, the sound source can be located at any locations in three-dimensional (3D) spaces relative to a reference origin (e.g., the midpoint A1 between the two microphones 111-112) at the boomless headset 200A/B/C/D. The term "target beam area (TBA)" refers to a beam area located in desired directions or a desired coordinate range, and audio signals from all target sound sources (Ta) inside the TBA need to be preserved or enhanced. The term "cancel beam area (CBA)" refers to a beam area located in un-desired directions or an un-desired coordinate range, and audio signals from all cancel sound sources (Ca) inside the CBA need to be suppressed or eliminated. It is assumed that the whole 3D space (where the microphone system 100 is disposed) minus the TBA leaves a CBA, i.e., the CBA is out of the TBA in 3D space. The term "multi-mic equivalent class" refers to multiple sound sources that have the same time delays relative to multiple microphones, but do not have the same locations.

Figure 3A:
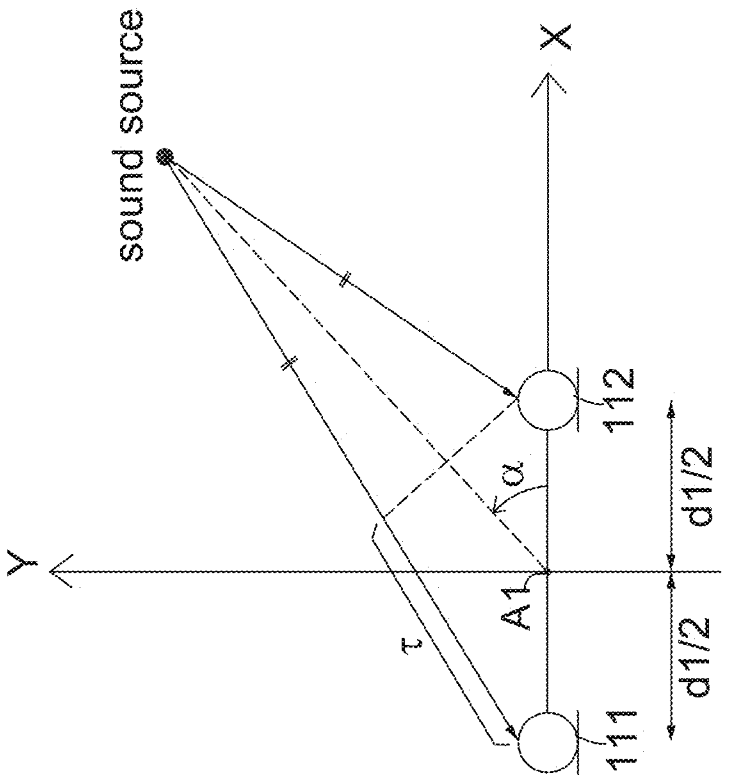
FIG. 3A is an example diagram of two microphones and a sound source.
Figure 3C:
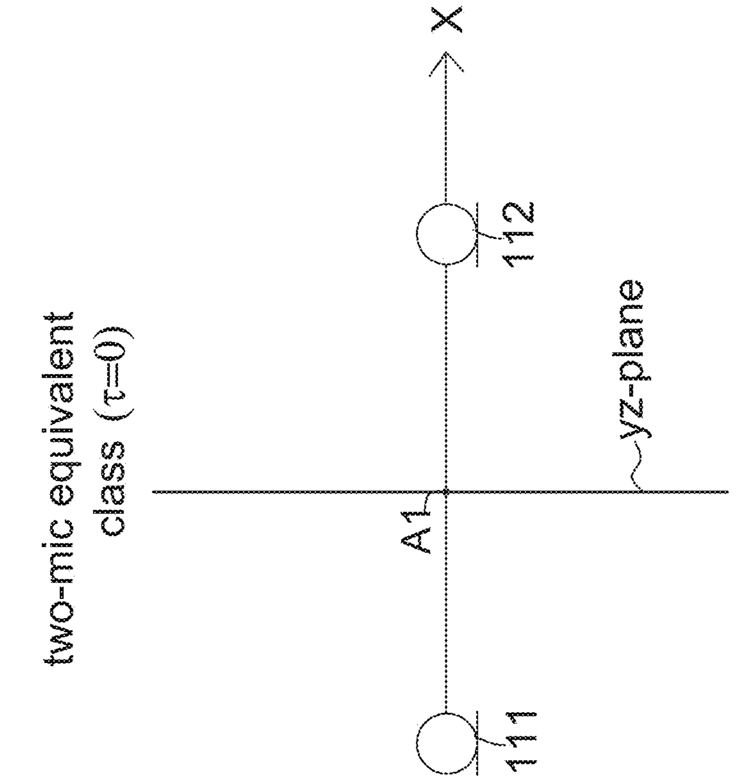
FIGS. 3B-3C show two different two-mic equivalent classes.
Figure 3B:
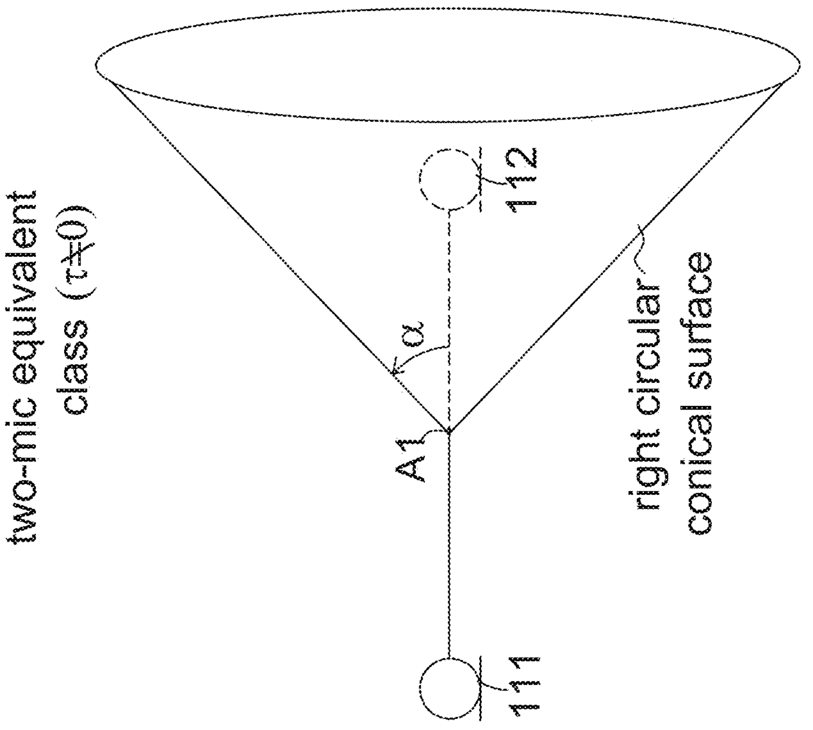

FIG. 3A is an example diagram of two microphones and a sound source. Referring to FIG. 3A, for two microphones 111 and 112, once a time delay τ is obtained, the angle α (i.e., a source direction) can be calculated with the help of trigonometric calculations. In other words, the time delay τ corresponds to the angle α. FIGS. 3B-3C show different two-mic equivalent classes for two microphones 111~112. The term "two-mic equivalent class" refers to multiple sound sources with different locations and the same time delays relative to a microphone pair (e.g., 111~112 or 112~113), and the locations of the multiple sound sources form a surface i.e., either a right circular conical surface or a plane. For example, multiple sound sources with different locations and the same time delay (τ≠0) form a right circular conical surface whose angle α corresponds to a time delay t as shown in FIG. 3B while multiple sound sources with different locations and the same time delay (τ=0) form a yz-plane orthogonal to the x axis as shown in FIG. 3C.

Figure 5A:
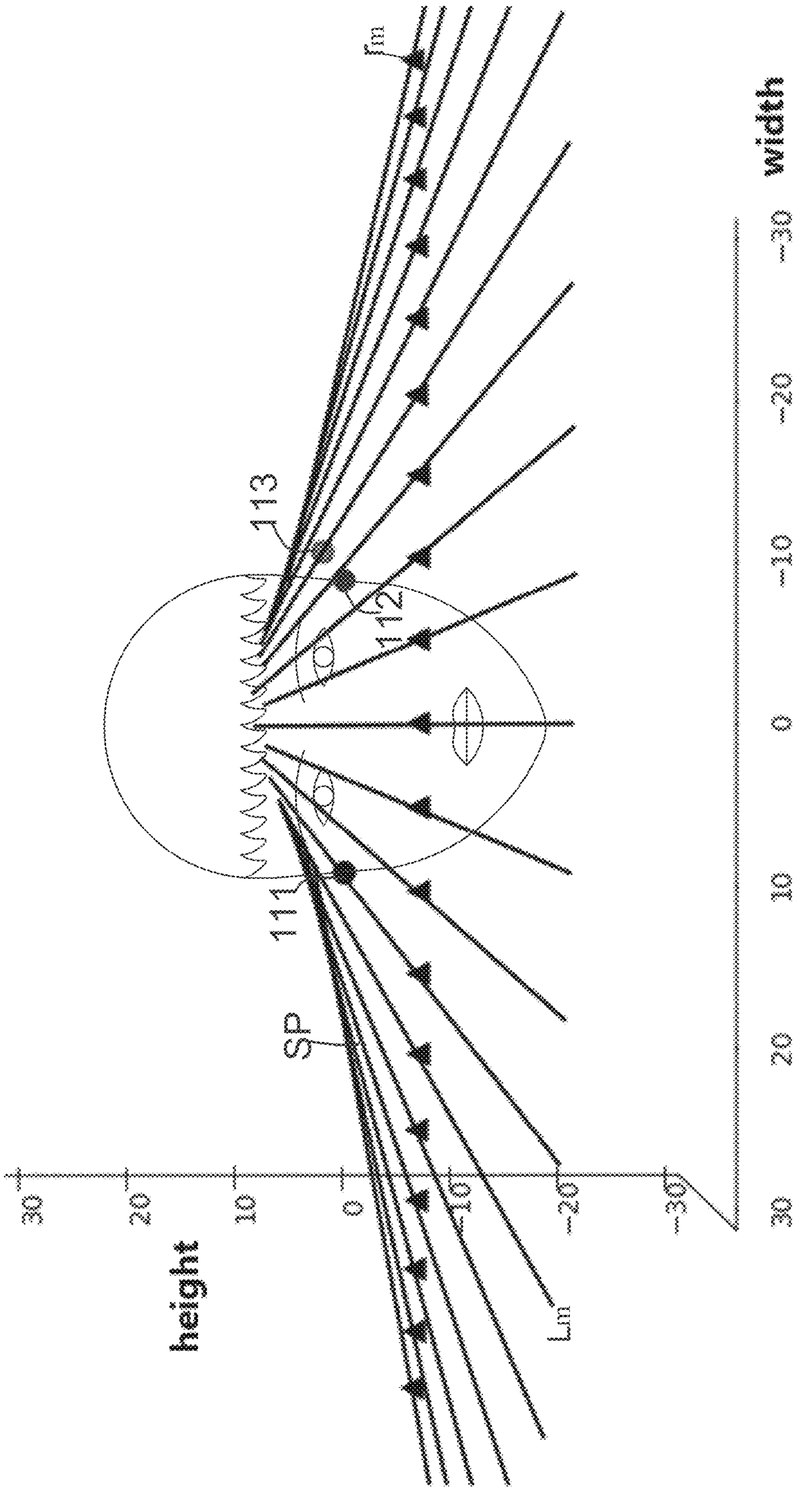
FIG. 5A is a diagram showing different straight/curved lines $L_m$ forming the separation plane SP when a user is facing us and wearing a boomless headset 200A with the microphone system 100.
Figure 5B:
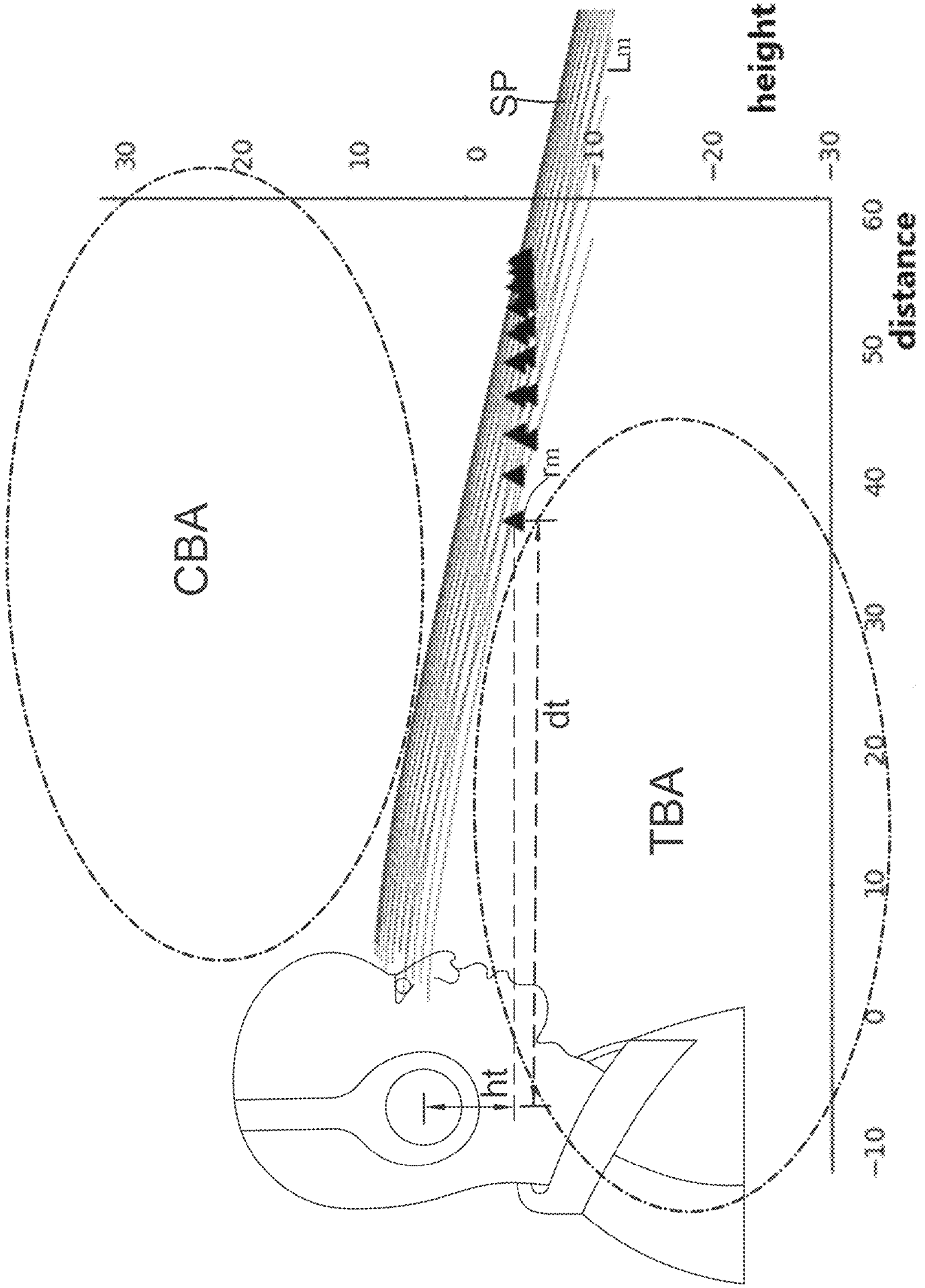
FIG. 5B is a side view showing a position relationship among the separation plane SP, the TBA and the CBA according to the user in FIG. 5A.
Figure 5C:
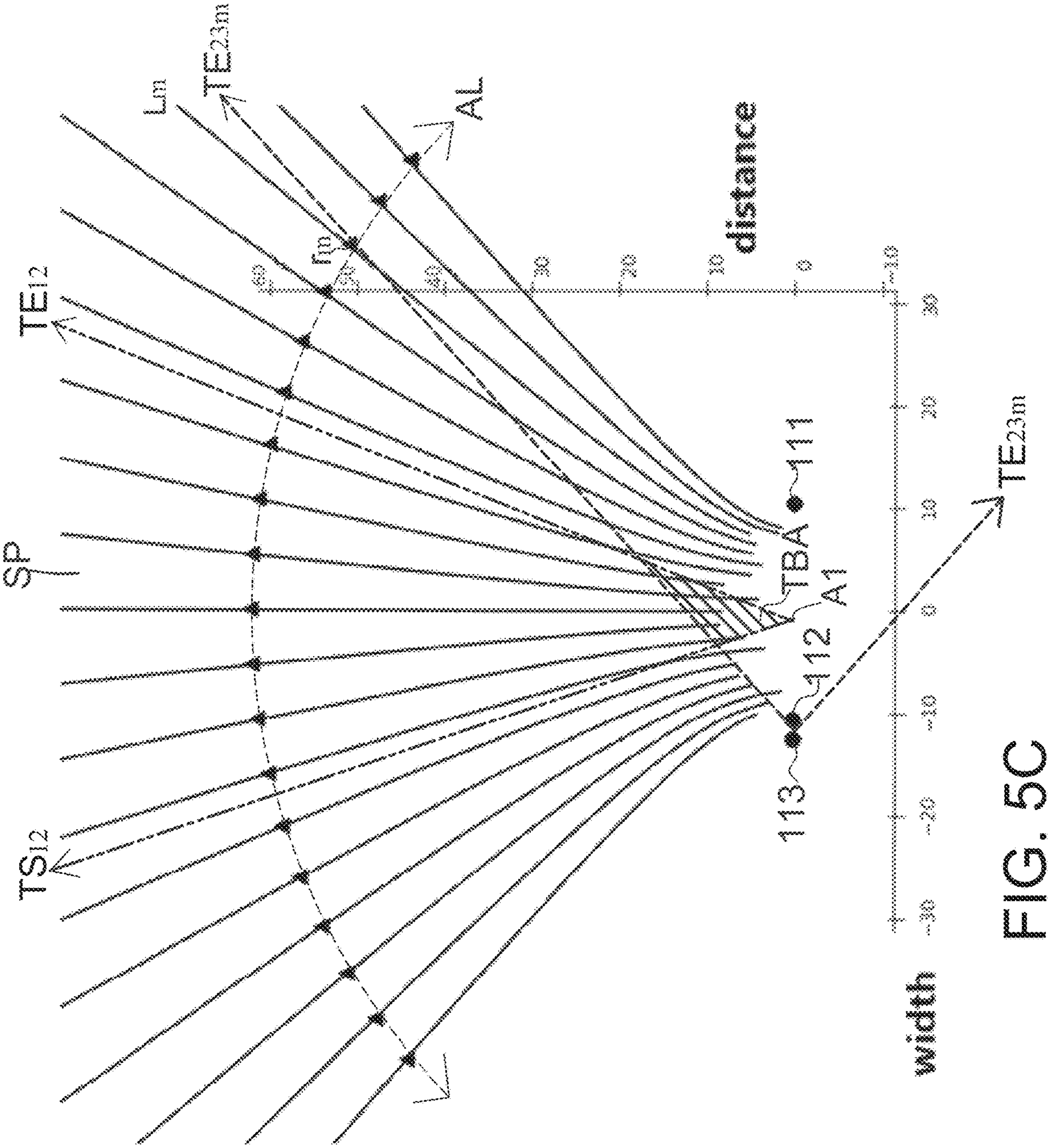
FIG. 5C is a top view showing different straight/curved lines $L_m$ forming the separation plane SP when the user in FIG. 5A looks forward.

A feature of the invention is to arrange the three microphones 111~113 in specific positions on two earcups 210 and 220 of a boomless headset 200A/B/C/D to eliminate voices from cancel sound sources with their locations higher than or farther than a predefined arc line AL (with a predefined vertical distance ht and a predefined horizontal distance dt from the midpoint A1 of two microphones 111-112 as shown in FIG. 5C) in front of the user, so as to achieve the goal of recoding the user's speech only.

A set of microphone coordinates for the microphone array 110 is defined as $M=\{M_1, M_2, \ldots, M_Q\}$, where $M_i=(x_i, y_i, z_i)$ denotes coordinates of for microphone 11*i* relative to a reference origin (such as the midpoint A1 between the two microphones 111-112) and 1<=i<=Q. Let a set of sound sources $S\subseteq\mathbb{R}^3$ and $t_{gi}$ denotes a propagation time of sound from a sound source $s_g$ to a microphone 11*i*, a location $L(s_g)$ of the sound source $s_g$ relative to the microphone array 110 is defined by R time delays for R combinations of two microphones out of the Q microphones as follows: $L(s_g)=\{(t_{g1}-t_{g2}), (t_{g1}-t_{g3}), \ldots, (t_{g1}-t_{gQ}), \ldots, (t_{g(Q-1)}-t_{gQ})\}$, where $\mathbb{R}^3$ denotes a three-dimensional space, 1<=g<=Z, $S\supseteq\{s_1, \ldots, s_Z\}$, Z denotes the number of sound sources, and R=Q!/((Q−2)!×2!).

Figure 4A:
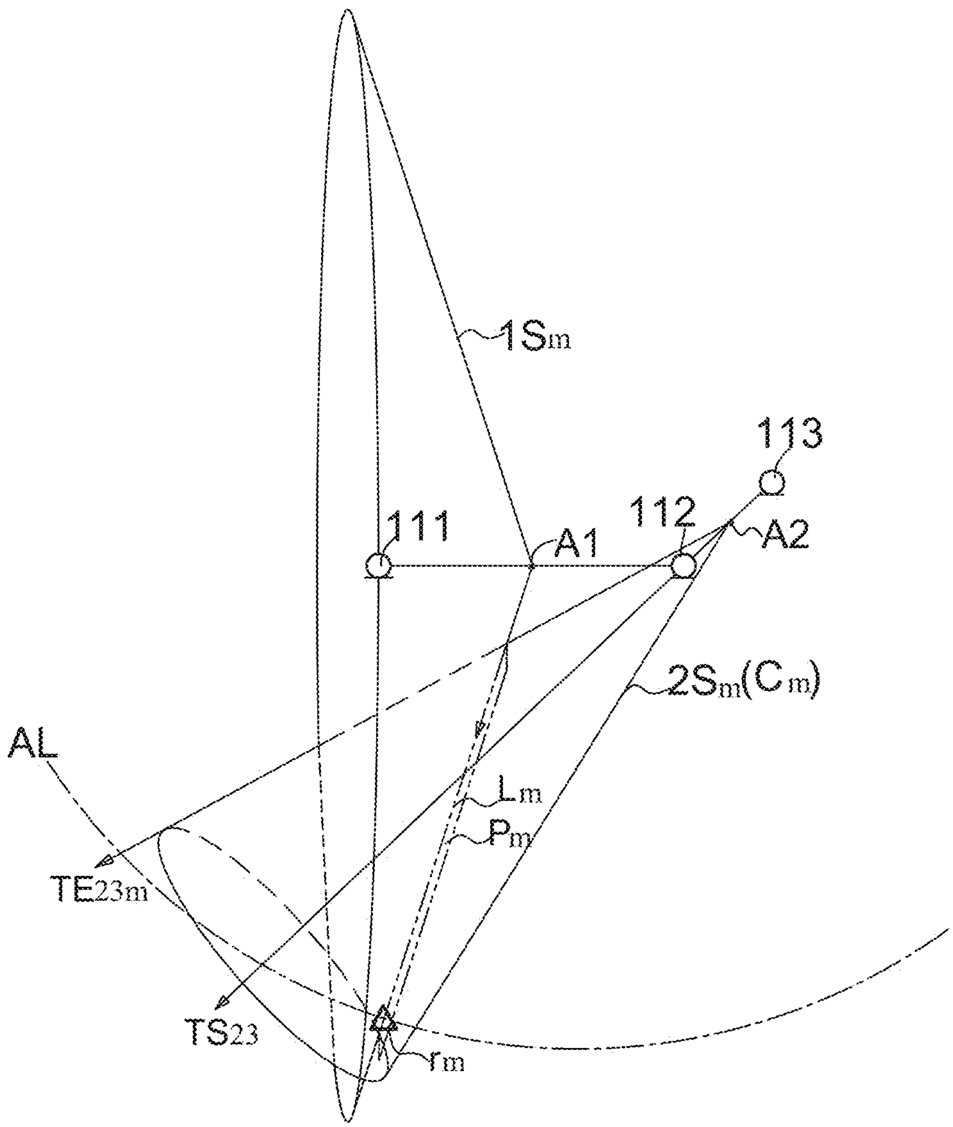
FIGS. 4A-4C are different example diagrams showing three different three-mic equivalent classes for different first two-mic equivalent classes $1S_m$ and different two-mic equivalent classes $2S_m$.
Figure 4B:
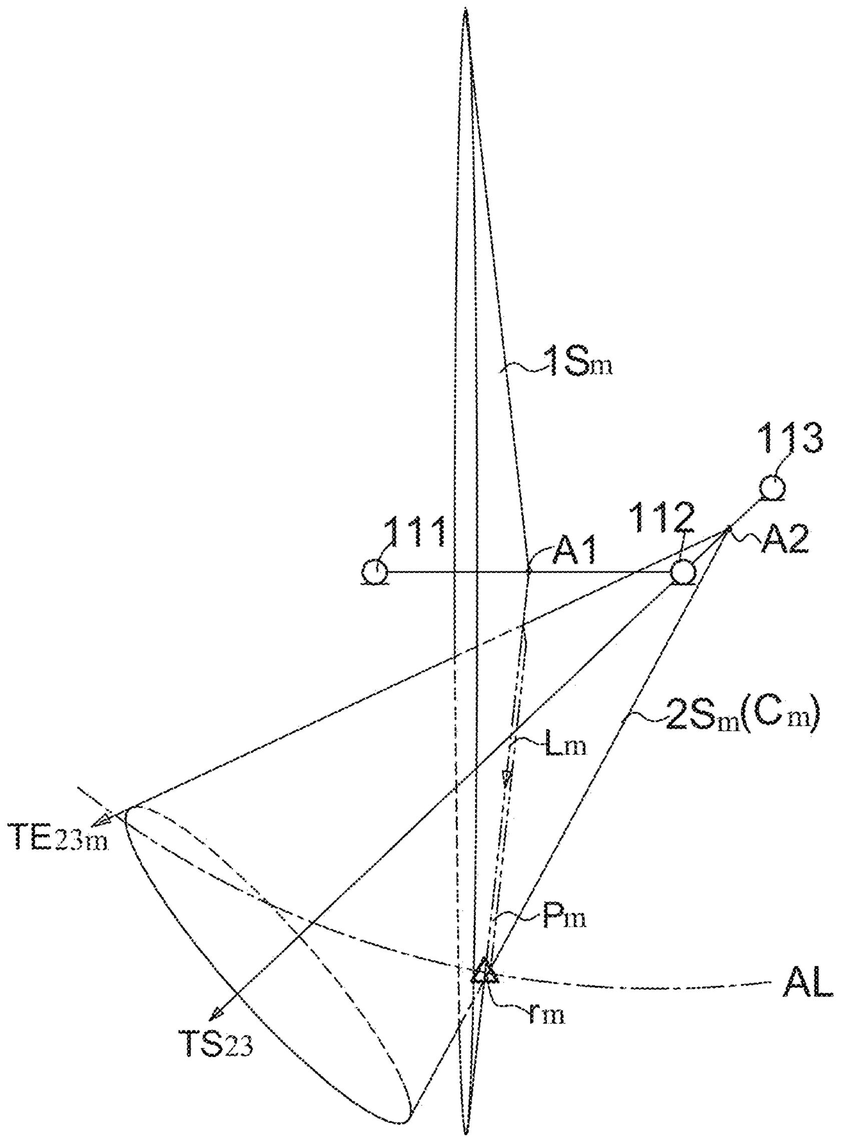
Figure 4C:
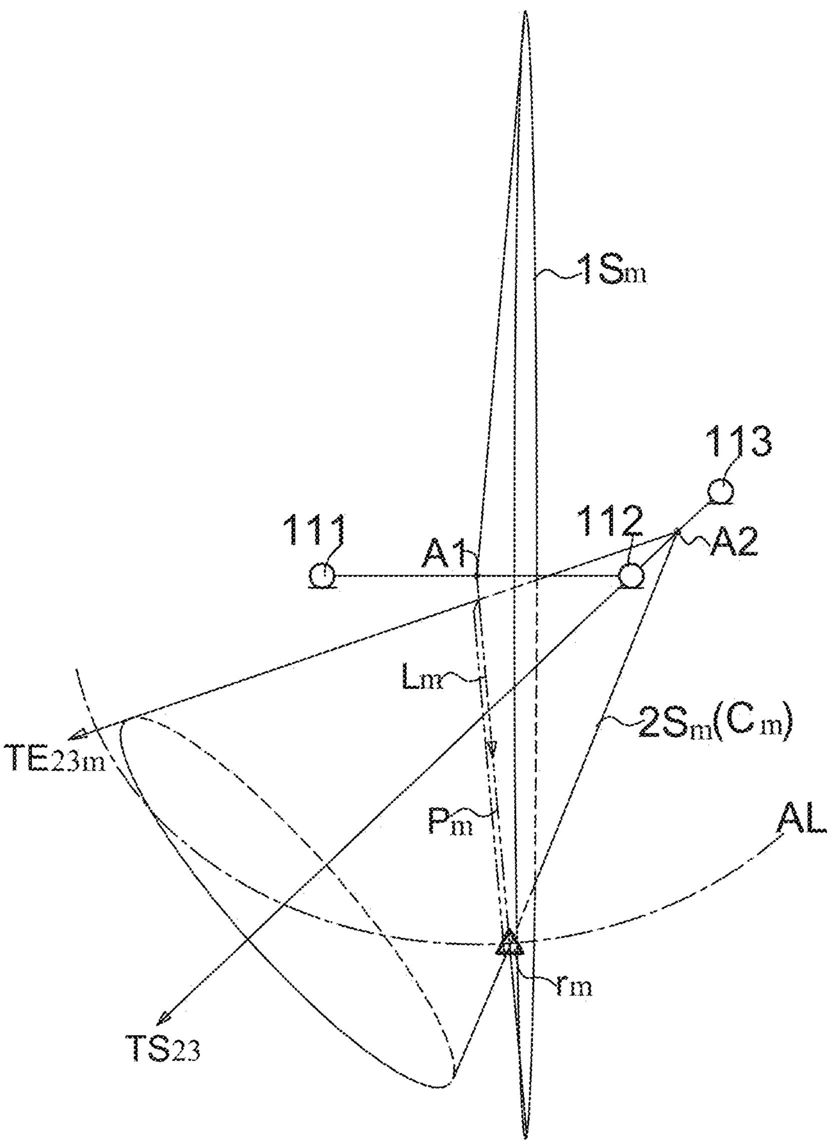

As set forth above, each two-mic equivalent class refers to a surface i.e., either a right circular conical surface or a plane. Consequently, a three-mic equivalent class for three microphones 111~113 is equivalent to the intersection of a first two-mic equivalent class (e.g., a first surface $1S_m$ in FIGS. 4A-4C) for two microphones 111~112 and a second two-mic equivalent class (e.g., a second surface $2S_m$ in FIGS. 4A-4C) for two microphones 112~113. FIGS. 4A-4C are different example diagrams showing three different three-mic equivalent classes for different first two-mic equivalent classes $1S_m$ and different second two-mic equivalent classes $2S_m$. Referring to FIGS. 4A-4C, given that a main time delay $\tau_{12}$ of a first two-mic equivalent class (forming a first surface $1S_m$) falls within a main time delay range of the lower limit $TS_{12}$ to the upper limit $TE_{12}$ (i.e., $TS_{12}<\tau_{12}<TE_{12}$) for the microphones 111-112, there must be a second two-equivalent class (forming a second surface $2S_m$) corresponding to an outer time delay $TE_{23m}$ for the microphones 112-113 so that the intersection of the two surfaces $1S_m$ and $2S_m$ forms a straight/curved line $L_m$ (i.e., a three-mic equivalent class) that is the upper edge of the TBA, where $\tau_{12}=t_{g1}-t_{g2}$, m denotes the equivalent class index, A2 denotes a midpoint between the two microphones 112-113, and $TE_{23m}$ is determined by the intersection point $r_m$ of the first surface $1S_m$ and the predefined arc line AL. On the other hand, the intersection of the first surface $1S_m$ and a right circular cone $C_m$ (that is limited by $TE_{23m}$ corresponding to an angle α) forms a plane $P_m$ with the $L_m$ line being the upper edge of the TBA, that is to say, the whole plane $P_m$ would be definitely inside the TBA. Since the $m/\tau_{12}$ values are continuous, the massive and continuous planes $P_m$ form the TBA. In other words, the TBA is a collection of the intersection planes $P_m$ of multiple first surfaces $1S_m$ and multiple right circular cones $C_m$.

Each AUX time delay range extends from a core time delay $TS_{23}$ to an outer time delay $TE_{23m}$ for either each second surface $2S_m$ or each right circular cone $C_m$ of the microphones 112 and 113. As long as a sound source $s_g$ and the microphones 112 and 113 (operating as an endfire array) are collinear (not shown), a core time delay $TS_{23}(=t_{g2}-t_{g3})$ would be equal to a propagation time $t_{g2}$ of sound from the sound source $s_g$ to a microphone 112 minus a propagation time $t_{g3}$ of sound from the sound source $s_g$ to a microphone 113, where the sound source se is closer to the microphone 112 than to the microphone 113. Thus, the core time delay $TS_{23}$ of the AUX time delay range for the microphones 112 and 113 is fixed for all second surfaces $2S_m$ or all right circular cones $C_m$. In an alternative embodiment, the core time delay $TS_{23}=(-d2/c)$, where d2 denotes the 3D distance between the two microphones 112 and 113 in FIG. 2B and c denotes a sound speed.

FIG. 5A is a diagram showing different straight/curved lines $L_m$ forming the separation plane SP when a user is facing towards us and wearing a boomless headset 200A with the microphone system 100. FIG. 5B is a side view showing a position relationship among the separation plane SP, the TBA and the CBA according to the user in FIG. 5A. FIG. 5C is a top view showing different straight/curved lines $L_m$ forming the separation plane SP when the user in FIG. 5A looks forward. As set forth above, the different straight/curved lines $L_m$ are the upper edges of TBA. Since the m values are continuous, the divergent, massive and continuous straight/curved lines $L_m$ form a separation plane SP, as shown in FIGS. 5A-5B. The separation plane SP can be regarded as a separation between the TBA and the CBA. For each $L_m$ line, the horizontal distance dt (e.g., 60 cm) and the vertical distance ht (e.g., 10 cm) from its intersection point $r_m$ to the midpoint A1 between the microphones 111 and 112 are the same and determined in advance. The multiple intersection points $r_m$ on the same horizontal plane form the predefined arc line AL. Thus, different main time delays 112 (or different m values) correspond to different first surfaces $1S_m$, and the different first surfaces $1S_m$ intersect the predefined arc line AL at different intersection points $r_m$ that determine different $TE_{23m}$ values for different second surfaces $2S_m$ (or different angles $\alpha$ for different right circular cones $C_m$).

Referring back to FIG. 1, the beamformer 120 may be implemented by a software program, custom circuitry, or by a combination of the custom circuitry and the software program. For example, the beamformer 120 may be implemented using at least one storage device and at least one of a GPU (graphics processing unit), a CPU (central processing unit), and a processor. The at least one storage device stores multiple instructions or program codes to be executed by the at least one of the GPU, the CPU, and the processor to perform all the steps of sound source classifying method in FIG. 6 and all the operations of the beamformer 120T/120*t*/120P described in FIGS. 7A-7D. Furthermore, persons of ordinary skill in the art will understand that any systems capable of performing the sound source classifying method and the operations of the beamformer 120T/120*t*/120P are within the scope and spirit of embodiments of the present invention.

Figure 6:
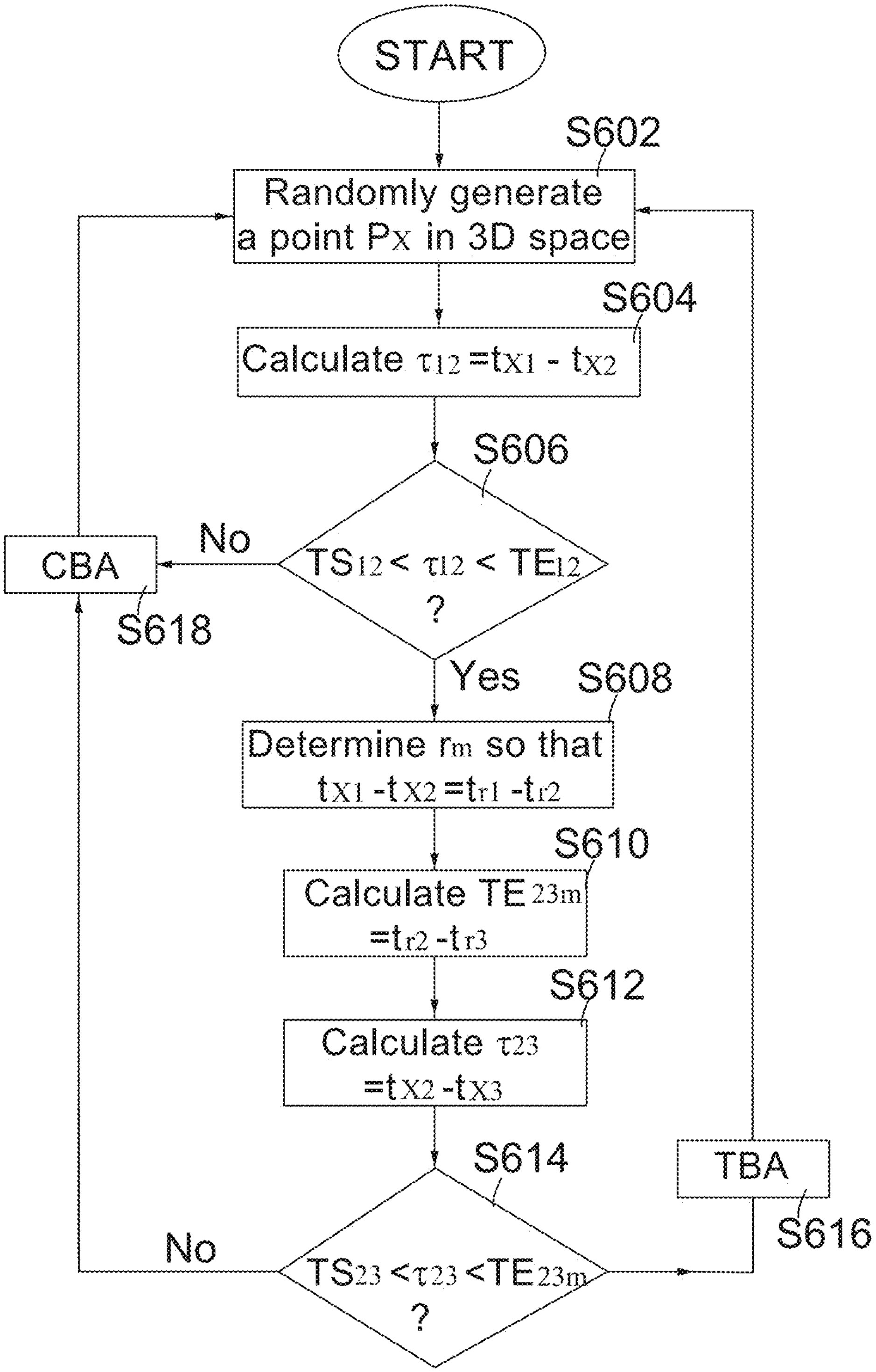
FIG. 6 is a flow chart of a method of classifying a sound source as one of a target sound source and a cancel sound source according to the invention.

FIG. 6 is a flow chart of a sound source classifying method according to an embodiment of the invention. The sound source classifying method is used to classify a sound source as one of a target sound source and a cancel sound source. In one embodiment, program codes of the classifying method in FIG. 6 are stored as one of the software programs 713 in the storage device 710 and executed by a processor 750 in FIG. 7A in an offline phase (will be described below) prior to a training phase. Hereinafter, the sound source classifying method is described with reference to FIGS. 2B, 4A-4C, 5A-5C and 6 and with assumption that the lower limit $TS_{12}$ and the upper limit $TE_{12}$ of the main time delay range for the two microphones 111 and 112 and the set M of microphone coordinates for the microphone array 110 are defined in advance. It is also assumed that (1) voices from a sound source with a main time delay out of the main time delay range (from $TS_{12}$ to $TE_{12}$) for the two microphones 111 and 112 would be cancelled; (2) the horizontal distance dt and the vertical distance ht for the predefined arc line AL relative to the midpoint A1 are 60 cm and 10 cm, respectively; (3) voices from sound sources with their locations farther than or higher than either the predefined arc line AL or the intersection points $r_m$ in front of the user would be cancelled/eliminated; (4) a core time delay $TS_{23}=(-d2/c)$, where d2 denotes the 3D distance between the two microphones 112 and 113 in FIG. 2B and c denotes a sound speed.

Step S602: Randomly generate a point/sound source Px with known coordinates relative to a known reference origin in 3D space by the processor 750.

Step S604: Calculate a main time delay $\tau_{12}(=t_{X1}-t_{X2})$ for the sound source Px relative to the two microphones 111-112 based on a difference of two propagation times $t_{X1}$ and $t_{X2}$, coordinates of the sound source Px and the set M of microphone coordinates for the microphone array 110, where $t_{X1}$ denotes a propagation time of sound from the sound source Px to the microphone 111 and $t_{X2}$ denotes a propagation time of sound from the sound source Px to the microphone 112.

Step S606: Determine whether $TS_{12}<\tau_{12}<TE_{12}$. If YES, the flow goes to step S608; otherwise, the flow goes to step S618.

Step S608: Calculate coordinates of an intersection point $r_m$ of the predefined arc line AL and a first surface $1S_m$ with the main time delay $\tau_{12}$ so that $t_{X1}-t_{X2}=\tau_{12}=t_{r1}-t_{r2}$, where $t_{r1}$ denotes a propagation time of sound from the intersection point $r_m$ to the microphone 111 and $t_{r2}$ denotes a propagation time of sound from the intersection point $r_m$ to the microphone 112.

Step S610: Calculate an outer time delay $TE_{23m}=t_{r2}-t_{r3}$ according to a difference of two propagation times $t_{r2}$ and $t_{r3}$ and the coordinates of the intersection point $r_m$ and the set M of microphone coordinates, where $t_{r3}$ denotes a propagation time of sound from the intersection point $r_m$ to the microphone 113.

Step S612: Calculate an AUX time delay $\tau_{23}(=t_{X2}-t_{X3})$ for the sound source Px according to a difference of propagation times $t_{X2}$ and $t_{X3}$, coordinates of the sound source Px and the set M of microphone coordinates, where $t_{X3}$ denotes a propagation time of sound from the sound source Px to the microphone 113.

Step S614: Determine whether the AUX time delay $\tau_{23}$ falls within the AUX time delay range of the core time delay $TS_{23}$ to the outer time delay $TE_{23m}$, i.e., determining whether $TS_{23}<\tau_{23}<TE_{23m}$. If YES, the flow goes to step S616; otherwise, the flow goes back to step S618.

Step S616: Determine that the sound source Px is located in the TBA and is a target sound source Ta. Then, the flow goes back to step S602.

Step S618: Determine that the sound source Px is located in the CBA and is a cancel sound source Ca. Then, the flow goes back to step S602.

For some cases (Layout 1B and 2B) that the microphone 113 is closer than the microphone 111/112 to the user mouth as shown in FIGS. 2D and 2F, calculate the core time delay $TS_{23}=(d2/c)$ instead.

Figure 7A:
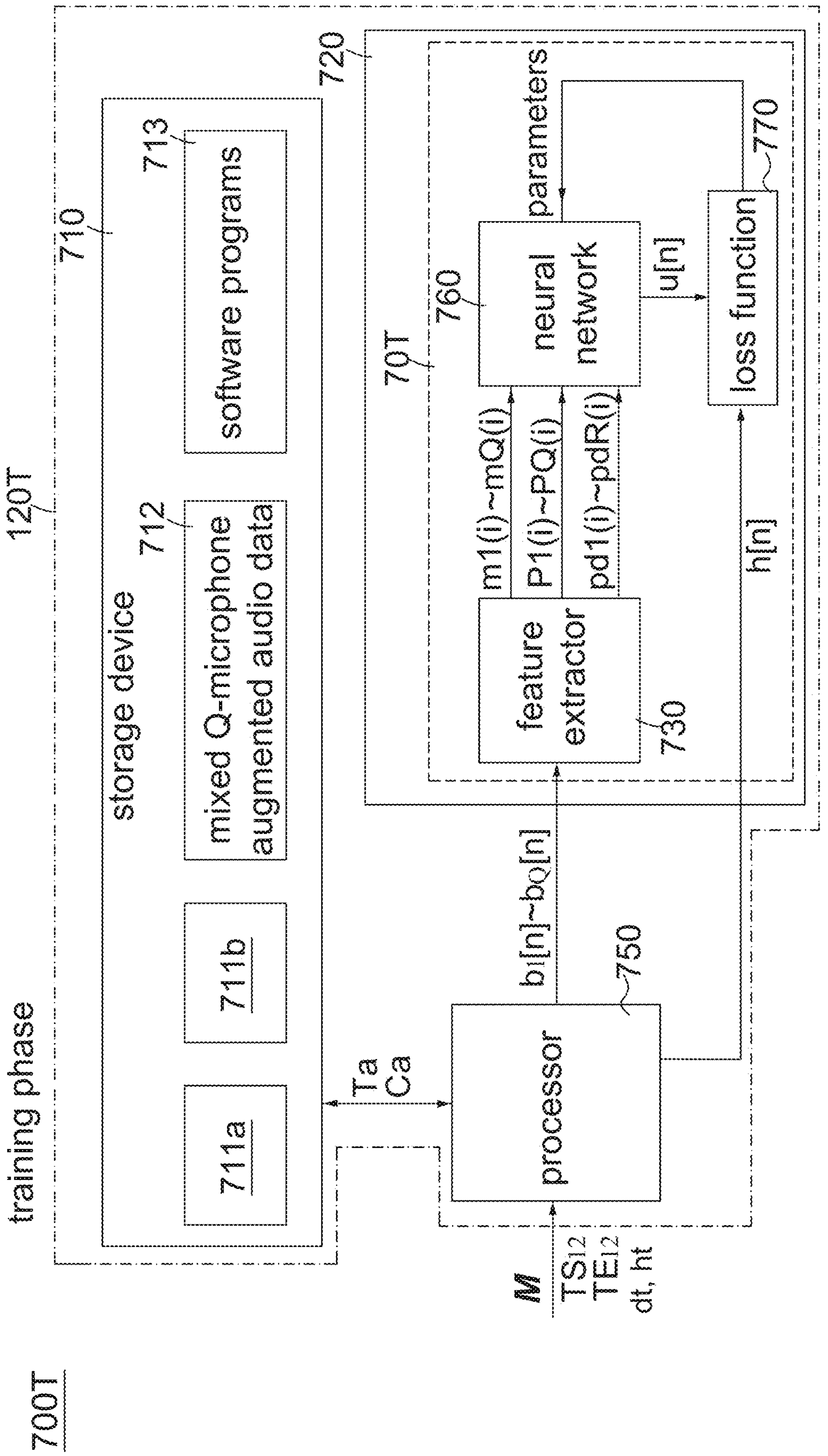
FIG. 7A is an exemplary diagram of a microphone system 700T in a training phase according to an embodiment of the invention.

FIG. 7A is an exemplary diagram of a microphone system 700T in a training phase according to an embodiment of the invention. In the embodiment of FIG. 7A, a microphone system 700T in a training phase includes a beamformer 120T that is implemented by a processor 750 and two storage devices 710 and 720. The storage device 710 stores instructions/program codes of software programs 713 operable to be executed by the processor 750 to cause the processor 750 to function as: the beamformer 120/120T/120*t*/120P. In an embodiment, a neural network module 70T, implemented by software and resident in the storage device 720, includes a feature extractor 730, a neural network 760 and a loss function block 770. In an alternative embodiment, the neural network module 70T is implemented by hardware (not shown), such as discrete logic circuits, application specific integrated circuits (ASIC), programmable gate arrays (PGA), field programmable gate arrays (FPGA), etc.

The neural network 760 of the invention may be implemented by any known neural network. Various machine learning techniques associated with supervised learning may be used to train a model of the neural network 760. Example supervised learning techniques to train the neural network 760 include, for example and without limitation, stochastic gradient descent (SGD). In the context of the following description, the neural network 760 operates in a supervised setting using a training dataset including multiple training examples, each training example including training input data (such as audio data in each frame of input audio signals $b_1[n]$ to $b_Q[n]$ in FIG. 7A) and training output data (ground truth) (such as audio data in each corresponding frame of output audio signals h[n] in FIG. 7A) pairs. The neural network 760 is configured to use the training dataset to learn or estimate the function $f$ (i.e., a trained model 760T), and then to update model weights using the backpropagation algorithm in combination with cost function. Backpropagation iteratively computes the gradient of cost function relative to each weight and bias, then updates the weights and biases in the opposite direction of the gradient, to find a local minimum. The goal of a learning in the neural network 760 is to minimize the cost function given the training dataset.

In an offline phase (prior to the training phase), the processor 750 is configured to respectively collect and store a batch of time-domain single-microphone noise-free (or clean) speech audio data (with/without reverberation in different space scenarios) 711*a* and a batch of time-domain single-microphone noise audio data 711*b* into the storage device 710. For the noise audio data 711*b*, all sound other than the speech being monitored (primary sound) is collected/recorded, including markets, computer fans, crowd, car, airplane, construction, keyboard typing, multiple-person speaking, etc. By executing one of the software programs 713 of any well-known acoustic simulation tools, such as Pyroomacoustics, stored in the storage device 710, the processor 750 operates as a data augmentation engine to construct different simulation scenarios involving Z sound sources, Q microphones and different acoustic environments based on a main time delay range of a lower limit $TS_{12}$ to a upper limit $TE_{12}$ for the two microphones 111-112, the predefined arc line AL with a vertical distance ht and a horizontal distance dt from the midpoint A1, the set M of microphone coordinates for the microphone array 110, the clean speech audio data 711*a* and the noise audio data 711*b*. By performing the sound source classifying method in FIG. 6, the Z sound sources are classified as z1 target sound sources (Ta) inside the TBA and z2 cancel sound sources (Ca) inside the CBA, where z1+z2=Z, and each of z1, z2 and Z is greater than or equal to 0.

The main purpose of the data augmentation engine 750 is to help the neural network 760 to generalize, so that the neural network 760 can operate in different acoustic environments. Please note that besides the acoustic simulation tools (such as Pyroomacoustics) and the classifying method in FIG. 6, the software programs 713 may include additional programs (such as an operating system or application programs) necessary to cause the beamformer 120/120T/120*t*/120P to operate.

Specifically, with Pyroomacoustics, the data augmentation engine 750 respectively transforms the single-microphone clean speech audio data 711*a* and the single-microphone noise audio data 711*b* into Q-microphone augmented clean speech audio data and Q-microphone augmented noisy audio data according to the set M of microphone coordinates and coordinates of both z1 target sound sources inside the TBA and z2 cancel sound sources inside the CBA, and then mixes the Q-microphone augmented clean speech audio data and the Q-microphone augmented noise audio data to generate and store a mixed Q-microphone time-domain augmented audio data 712 in the storage device 710. In particular, the Q-microphone augmented noise audio data is mixed in with the Q-microphone augmented clean speech audio data at different mixing rates to produce the mixed Q-microphone time-domain augmented audio data 712 having a wide range of SNRs.

In the training phase, the mixed Q-microphone time-domain augmented audio data 712 are used by the processor 750 as the training input data (i.e., input audio data $b_1[n]$ ~$b_Q[n]$) for the training examples of the training dataset. Correspondingly, clean or noisy time-domain resultant audio data transformed from a combination of the clean speech audio data 711*a* and the noise audio data 711*b* according to coordinates of the z1 target sound sources and the set M of microphone coordinates are used by the processor 750 as the training output data (i.e., h[n]) for the training examples of the training dataset. Thus, in the training output data, audio data originated from the z1 target sound sources are preserved and audio originated from the z2 cancel sound sources are cancelled.

Figure 7B:
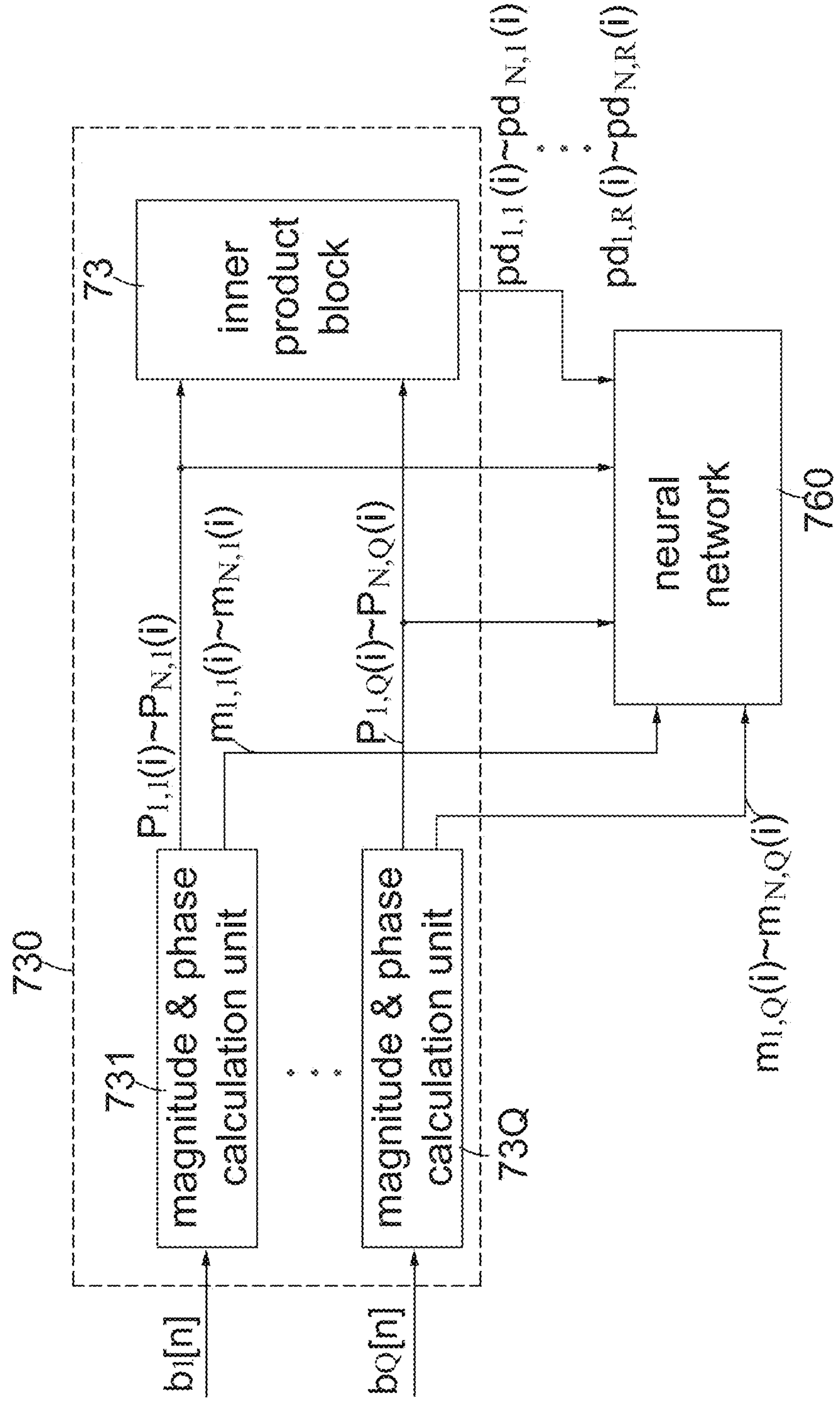
FIG. 7B is a schematic diagram of a feature extractor 730 according to an embodiment of the invention.

FIG. 7B is a schematic diagram of a feature extractor 730 according to an embodiment of the invention. Referring to FIG. 7B, the feature extractor 730, including Q magnitude & phase calculation units 731~73Q and an inner product block 73, is configured to extract features (e.g., magnitudes, phases and phase differences) from complex-valued samples of audio data of each frame in Q input audio streams ($b_1[n]$~$b_Q[n]$).

In each magnitude & phase calculation unit 73*j*, the input audio stream $b_j[n]$ is firstly broken up into frames using a sliding window along the time axis so that the frames overlap each other to reduce artifacts at the boundary, and then, the audio data in each frame in time domain are transformed by Fast Fourier transform (FFT) into complex-valued data in frequency domain, where 1=<j<=Q and n denotes the discrete time index. Assuming a number of sampling points in each frame (or the FFT size) is N, the time duration for each frame is Td and the frames overlap each other by Td/2, the magnitude & phase calculation unit 73*j* divides the input stream $b_j[n]$ into a plurality of frames and computes the FFT of audio data in the current frame i of the input audio stream $b_j[n]$ to generate a current spectral representation $F_j(i)$ having N complex-valued samples ($F_{1,j}(i)$-$F_{N,j}(i)$) with a frequency resolution of fs/N(=1/Td), where 1<=j<=Q, i denotes the frame index of the input/output audio stream $b_j[n]$/u[n]/h[n], fs denotes a sampling frequency of the input audio stream $b_j[n]$ and each frame corresponds to a different time interval of the input stream $b_j[n]$. Next, the magnitude & phase calculation unit 73*j* calculates a magnitude and a phase for each of N complex-valued samples ($F_{1,j}(i)$, . . . , $F_{N,j}(i)$) based on its length and arctangent function to generate a magnitude spectrum (mj(i)=$m_{1,j}(i)$, . . . , $m_{N,j}(i)$) with N magnitude elements and a phase spectrum (Pj(i)=$_{1,j}(i)$, . . . , $P_{N,j}(i)$) with N phase elements for the current spectral representation Fj(i) (=$F_{1,j}i$), . . . , $F_{N,j}(i)$). Then, the inner product block 73 calculates the inner product for each of N normalized-complex-valued sample pairs in any two phase spectrums Pj(i) and Pk(i) to generate R phase-difference spectrums (pd*l*(i)=$pd_{1,l}(i)$, . . . , $pd_{N,l}(i)$), each phase-difference spectrum pd*l*(i) having N elements, where 1<=k<=Q, j≠k, 1<=l<=R, and there are R combinations of two microphones out of the Q microphones. Finally, the Q magnitude spectrums mj(i), the Q phase spectrums Pj(i) and the R phase-difference spectrums pd*l*(i) are used/regarded as a feature vector fv(i) and fed to the neural network 760/760T. In a preferred embodiment, the time duration Td of each frame is about 32 milliseconds (ms). However, the above time duration Td is provided by way of example and not limitation of the invention. In actual implementations, other time duration Td may be used.

In the training phase, the neural network 760 receives the feature vector fv(i) including the Q magnitude spectrums m1(*i*)~mQ(i), the Q phase spectrums P1(*i*)-PQ(i) and the R phase-difference spectrums pd1(*i*)~pdR(i), and then generates corresponding network output data, including N first sample values of the current frame i of a time-domain beamformed output stream u[n]. On the other hand, the training output data (ground truth), paired with the training input data (i.e., Q*N input sample values of the current frames i of the Q training input streams $b_1[n]$~$b_Q[n]$) for the training examples of the training dataset, includes N second sample values of current frame i of a training output audio stream h[n] and are transmitted to the loss function block 770 by the processor 750. If z1>0 and the neural network 760 is trained to perform the spatial filtering operation only, the training output audio stream h[n] outputted from the processor 750 would be the noisy time-domain resultant audio data (transformed from a combination of the clean speech audio data 711*a* and the noise audio data 711*b* according to coordinates of the z1 target sound sources). If z1>0 and the neural network 760 is trained to perform spatial filtering and denoising operations, the training output audio stream h[n] outputted from the processor 750 would be the clean time-domain resultant audio data (transformed from the clean speech audio data 711*a* according to coordinates of the z1 target sound sources). If z1=0, the training output audio stream h[n] outputted from the processor 750 would be "zero" time-domain resultant audio data, i.e., each output sample value being set to zero.

Then, the loss function block 770 adjusts parameters (e.g., weights) of the neural network 760 based on differences between the network output data and the training output data. In one embodiment, the neural network 760 is implemented by a deep complex U-Net, and correspondingly the loss function implemented in the loss function block 770 is weighted-source-to-distortion ratio (weighted-SDR) loss, disclosed by Choi et al., "Phase-aware speech enhancement with deep complex U-net", a conference paper at ICRL 2019. However, it should be understood that the deep complex U-Net and the weighted-SDR loss have been presented by way of example only, and not limitation of the invention. In actual implementations, any other neural networks and loss functions can be used and this also falls in the scope of the invention. Finally, the neural network 760 is trained so that the network output data (i.e., the N first sample values in u[n]) produced by the neural network 760 matches the training output data (i.e., the N second sample values in h[n]) as closely as possible when the training input data (i.e., the Q*N input sample values in $b_1[n]$~$b_Q[n]$) paired with the training output data is processed by the neural network 760.

Figure 7C:
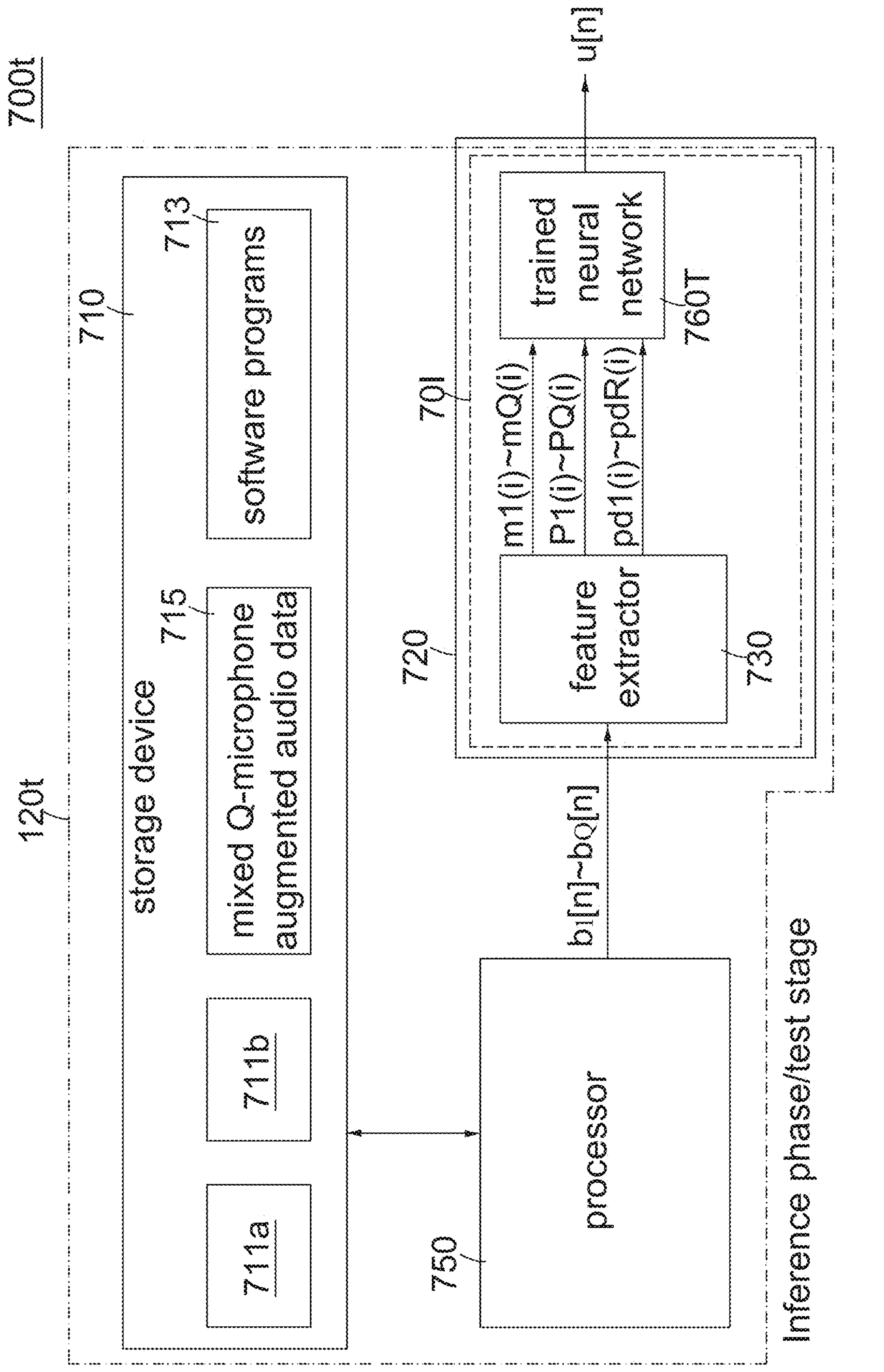
FIG. 7C is an example apparatus of a microphone system 700*t* in a test stage according to an embodiment of the invention.

The inference phase is divided into a test stage (e.g., the microphone system 700*t* is tested by an engineer in a R&D department to verify performance) and a practice stage (i.e., microphone system 700I is ready on the market). FIG. 7C is an example apparatus of a microphone system 700*t* in a test stage according to an embodiment of the invention. In the test stage, a microphone system 700*t* includes a beamformer 120*t* only, without the microphone array 110; besides, the clean speech audio data 711*a*, the noise audio data 711*b*, a mixed Q-microphone time-domain augmented audio data 715 and the software programs 713 are resident in the storage device 710. Please note that generations of both the mixed Q-microphone time-domain augmented audio data 712 and 715 are similar. However, since the mixed Q-microphone time-domain augmented audio data 712 and 715 are transformed from a combination of the clean speech audio data 711*a* and the noise audio data 711*b* with different mixing rates and different acoustic environments, it is not likely for the mixed Q-microphone time-domain augmented audio data 712 and 715 to have the same contents. The mixed Q-microphone time-domain augmented audio data 715 are used by the processor 750 as the input audio data (i.e., input audio data $b_1[n]$~$b_Q[n]$) in the test stage. In an embodiment, a neural network module 70I, implemented by software and resident in the storage device 720, includes the feature extractor 730 and a trained neural network 760T. In an alternative embodiment, the neural network module 70I is implemented by hardware (not shown), such as discrete logic circuits, ASIC, PGA, FPGA, etc.

Figure 7D:
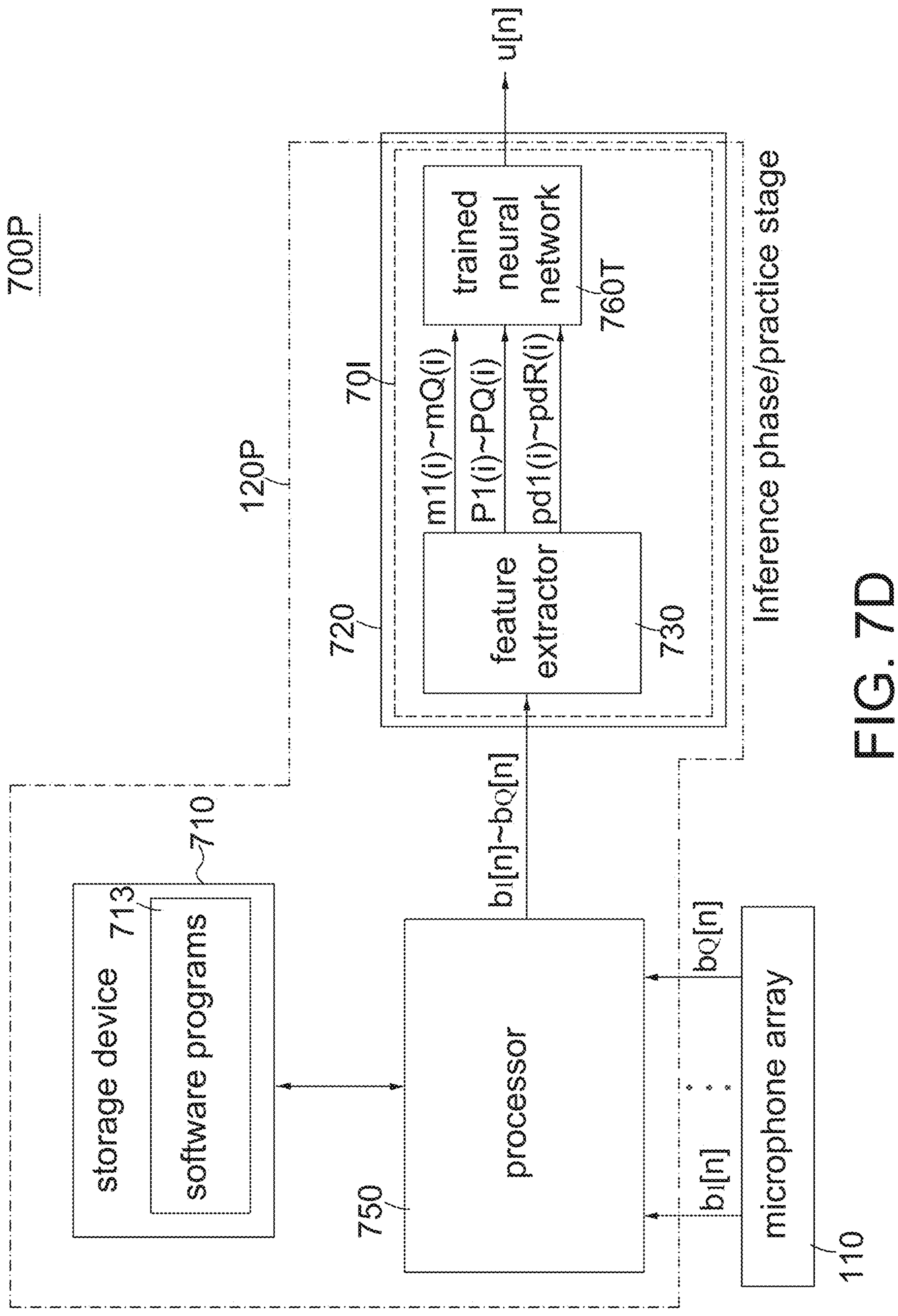
FIG. 7D is an example apparatus of a microphone system 700P in a practice stage according to an embodiment of the invention.

FIG. 7D is an example apparatus of a microphone system 700P in a practice stage according to an embodiment of the invention. In the practice stage, the microphone system 700P includes a beamformer 120P and the microphone array 110; besides, only the software programs 713 are resident in the storage device 710. The processor 750 directly delivers the input audio data (i.e., $b_1[n]$~$b_Q[n]$) from the microphone array 110 to the feature extractor 730. The feature extractor 730 extracts a feature vector fv(i) (including Q magnitude spectrums m1(*i*)-mQ(i), Q phase spectrums P1(*i*)-PQ(i) and R phase-difference spectrums pd1(*i*)-pdR(i)) from Q current spectral representations F1(*i*)-FQ(i) of audio data of current frames i in Q input audio streams ($b_1[n]$~$b_Q[n]$). The trained neural network 760T performs spatial filtering operation with or without denoising operation over the feature vector fv(i) for the current frames i of the input audio streams $b_1[n]$-$b_Q[n]$ based on the predefined arc line AL, the main time delay range of the lower limit $TS_{12}$ to the upper limit $TE_{12}$ for the two microphones 111-112 and the set M of microphone coordinates of the microphone array 110 to generate time-domain sample values of the current frame i of the clean/noisy beamformed output stream u[n] originated from z1 target sound sources inside the TBA, where z1>=0. If z1=0, each sample value of the current frame i of the beamformed output stream u[n] would be equal to zero.

Figure 8A:
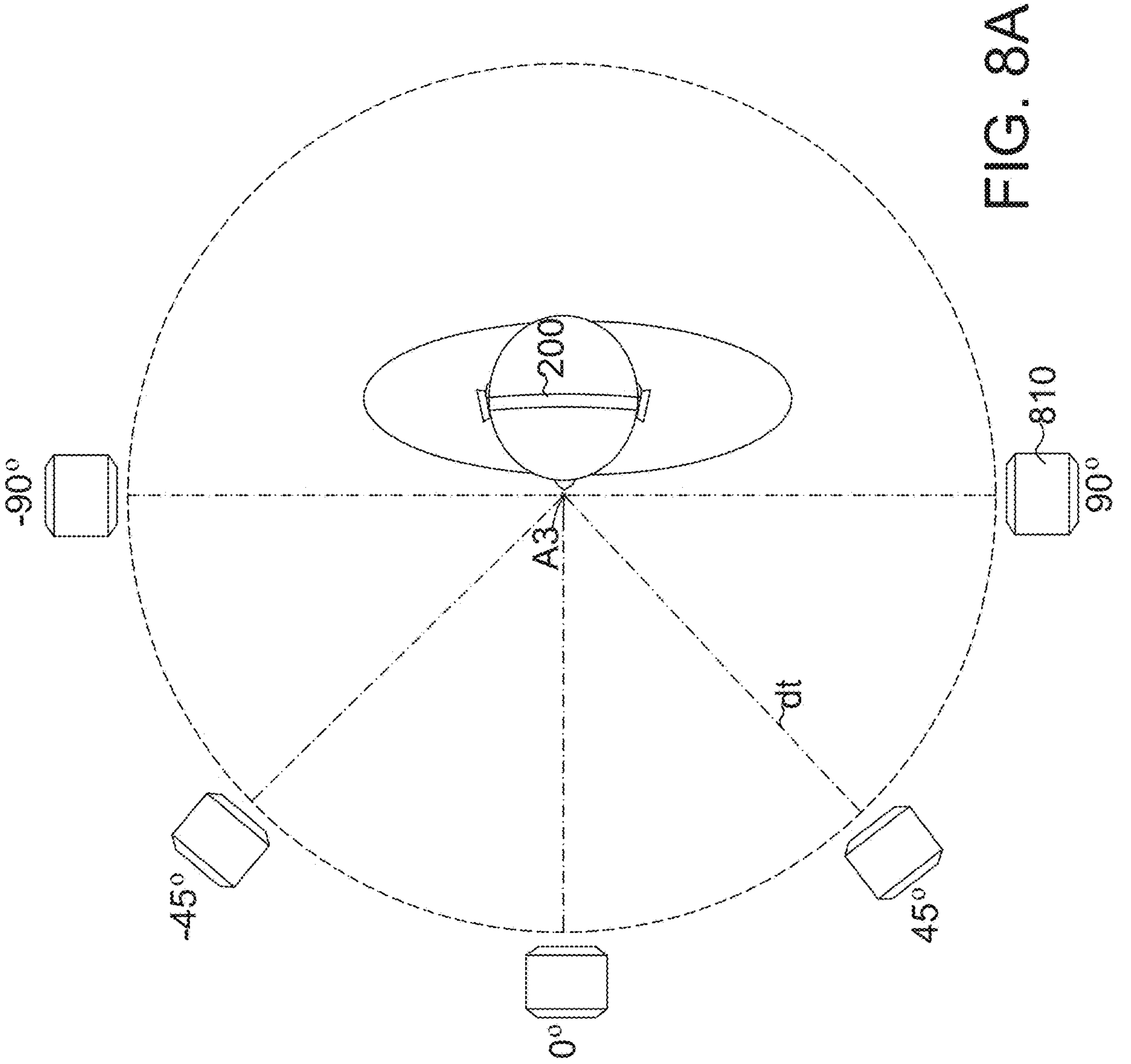
FIG. 8A shows a first test specification for the boomless headset 200A/B/C/D with the microphone system 100 that meets the Microsoft Teams open office standards for voice cancellation.
Figure 8B:
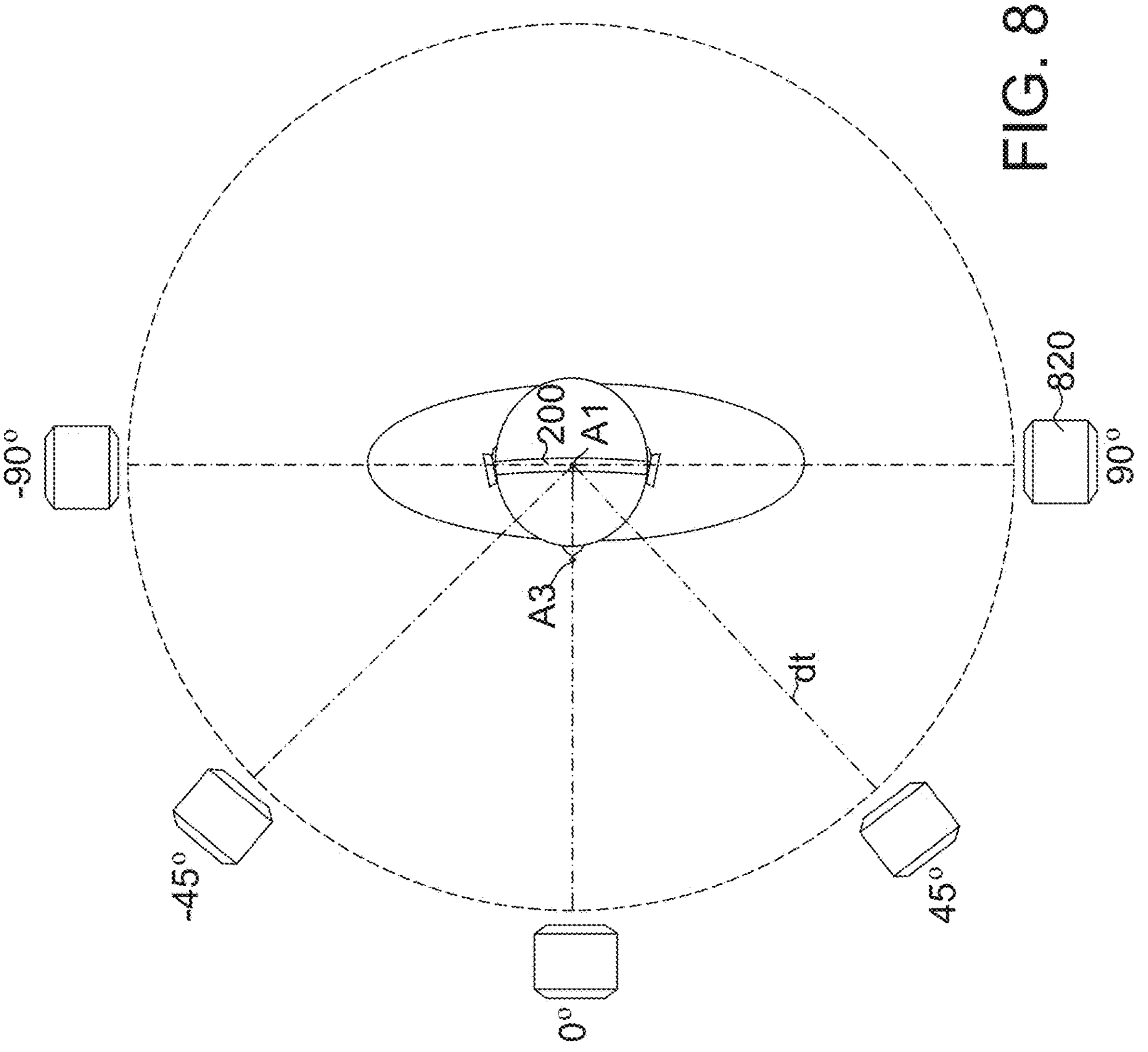
FIG. 8B shows a second test specification for the boomless headset 200A/B/C/D with the microphone system 100 according to the invention.

The performance of the microphone system 100 of the invention has been tested and verified according to two test specifications in FIGS. 8A-8B. FIG. 8A shows a first test specification for the boomless headset 200A/B/C/D with the microphone system 100 that meets the Microsoft Teams open office standards for voice cancellation. FIG. 8B shows a second test specification for the boomless headset 200A/B/C/D with the microphone system 100 according to the invention. To pass the first test specification in FIG. 8A, voices from sound sources with their locations farther than a horizontal distance dt (=60 cm) away from a user's mouth A3 need to be cancelled/eliminated. To pass the second test specification in FIG. 8B, voices from sound sources with their locations farther than or higher than the predefined arc line AL (with a horizontal distance dt and a vertical distance ht from the midpoint A1 of the microphones 111-112) in front of the user need to be cancelled/eliminated by the microphone system 100. In each of FIGS. 8A-8B, there are five speech distractors (such as speakers) 810/820 arranged at different locations on a dt-radius circle and having the same heights as the user mouth A3; in addition, voices from the five speech distractors 810/820 need to be cancelled. In fact, the test specification in FIG. 8B is stricter than that in FIG. 8A when the horizontal distance dt in FIGS. 8A-8B is fixed, since the midpoint A1 is closer to the speech distractors 820 in FIG. 8B than to the speech distractors 810 in FIG. 8A.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A microphone system applicable to a boomless headset with two earcups, comprising:

a microphone array comprising Q microphones that detect sound and generate Q audio signals, wherein a first microphone and a second microphone of the Q microphones are disposed on different earcups, wherein a third microphone of the Q microphones is disposed on one of the two earcups and displaced laterally and vertically from one of the first and the second microphones; and a processing unit configured to perform a set of operations comprising:

performing spatial filtering over the Q audio signals using a trained model based on an arc line with a vertical distance and a horizontal distance from a first midpoint of the first and the second microphones, a main time delay range for the first and the second microphones and coordinates of the Q microphones to generate a beamformed output signal originated from zero or more target sound sources inside a target beam area (TBA), where Q>=3;

wherein the TBA is a collection of intersection planes of multiple surfaces and multiple cones;

wherein the multiple surfaces correspond to multiple main time delays within the main time delay range, and angles of the multiple cones are related to multiple intersection points of the multiple surfaces and the arc line; and wherein the multiple surfaces extend from the first midpoint, and the multiple cones extend from a second midpoint between the third microphone and the one of the first and the second microphones.

2. The microphone system according to claim 1, wherein the first and the second microphones are spaced apart along a first axis, wherein a connection line going through the one of the first and the second microphones and the third microphone is projected on a first plane formed by the first axis and a second axis to produce a first projected line, and wherein the first projected line and the first axis form a first angle greater than zero, and the second axis is orthogonal to a horizontal plane.

3. The microphone system according to claim 2, wherein the connection line is projected on a second plane formed by the first axis and a third axis to form a second projected line, and wherein the second projected line and the third axis form a second angle, and the third axis is orthogonal to the first and the second axes.

4. The microphone system according to claim 1, wherein each of the multiple surfaces is one of a third plane and a right circular conical surface.

5. The microphone system according to claim 4, wherein the third plane is orthogonal to a straight line going through the first and the second microphones, and wherein a vertex of each right circular conical surface is located at the first midpoint, and an angle of each right circular conical surface correspond to one of the multiple main time delays.

6. The microphone system according to claim 1, wherein the third microphone is displaced outward and upward from one of the first and the second microphones, and wherein the multiple cones extend from the second midpoint towards a direction opposite to the third microphone.

7. The microphone system according to claim 1, wherein the third microphone is displaced inward and downward from one of the first and the second microphones, and wherein the multiple cones extend from the second midpoint towards the third microphone.

8. The microphone system according to claim 1, wherein the set of operations further comprises:

in an offline phase prior to a training phase, randomly generating Z sound sources with known coordinates in a three-dimensional (3D) space; and classifying the Z sound sources as z1 target sound sources inside the TBA and z2 cancel sound sources inside a cancel beam area, where z1+z2=Z, and each of z1, z2 and Z is greater than or equal to 0;

wherein the cancel beam area is out of the TBA in the 3D space.

9. The microphone system according to claim 8, wherein the set of operations further comprises:

in the offline phase, transforming single-microphone noise-free speech audio data and single-microphone noise audio data into mixed Q-microphone augmented audio data according to the coordinates of the z1 target sound sources, the z2 cancel sound sources and the Q microphones by a known acoustic simulation tool; and transforming the single-microphone noise-free speech audio data and the single-microphone noise audio data into resultant audio data according to the coordinates of the Q microphones and the z1 target sound sources by the known acoustic simulation tool.

10. The microphone system according to claim 9, wherein the set of operations further comprises:

in the training phase, training the trained model with multiple training examples, each training example comprising training input data and training output data, wherein the training input data and the training output data are respectively selected from the mixed Q-microphone augmented audio data and the resultant audio data.

11. The microphone system according to claim 8, wherein the operation of classifying comprises:

calculating a main time delay for a sound source selected from the Z sound sources according to a difference of two propagation times of sound from the selected sound source to the first and the second microphones;

defining the selected sound source as a cancel sound source when the main time delay for the selected sound source falls out of the main time delay range;

when the main time delay for the selected sound source falls within the main time delay range, calculating coordinates of an intersection point of the arc line and one of the surfaces corresponding to the main time delay for the selected sound source, calculating an outer time delay for the intersection point according to a difference of two propagation times of sound from the intersection point to the third microphone and the one of the first and the second microphones, and calculating an AUX time delay for the selected sound source according to a difference of two propagation times of sound from the selected sound source to the third microphone and the one of the first and the second microphones; and when the AUX time delay for the selected sound source falls out of an AUX time delay range of a core time delay to the outer time delay, defining the selected sound source as a cancel sound source, otherwise defining the selected sound source as a target sound source;

wherein the core time delay is related to a three-dimensional (3D) distance between the third microphone and the one of the first and the second microphones.

12. The system according to claim 1, wherein the operation of performing the spatial filtering further comprises:

performing the spatial filtering and a denoising operation over the Q audio signals using the trained model based on the arc line, the main time delay range and the coordinates of the Q microphones to generate a noise-fee beamformed output signal originated from the zero or more target sound sources.

13. The system according to claim 1, wherein the operation of performing the spatial filtering further comprises:

performing the spatial filtering over a feature vector for the Q audio signals using the trained model based on the arc line, the main time delay range and the coordinates of the Q microphones to generate the beamformed output signal;

wherein the set of operations further comprises:

extracting the feature vector from Q spectral representations of the Q audio signals;

wherein the feature vector comprises Q magnitude spectrums, Q phase spectrums and R phase-difference spectrums; and wherein the R phase-difference spectrums are related to inner products for R combinations of two phase spectrums out of the Q phase spectrums.

14. A beamforming method, applicable to a boomless headset comprising two earcups and a microphone array, the method comprising:

disposing a first microphone and a second microphone of Q microphones in the microphone array on different earcups;

disposing a third microphone of the Q microphones on one of the two earcups such that the third microphone is displaced laterally and vertically from one of the first and the second microphones;

detecting sound by the Q microphones to generate Q audio signals; and performing spatial filtering over the Q audio signals using a trained model based on an arc line with a vertical distance and a horizontal distance from a first midpoint between the first and the second microphones, a main time delay range for the first and the second microphones and coordinates of the Q microphones to generate a beamformed output signal originated from zero or more target sound sources inside a target beam area (TBA), where Q>=3;

wherein the TBA is a collection of intersection planes of multiple surfaces and multiple cones;

wherein the multiple surfaces correspond to multiple main time delays within the main time delay range, and angles of the multiple cones are related to multiple intersection points of the multiple surfaces and the arc line; and wherein the multiple surfaces extend from the first midpoint, and the multiple cones extend from a second midpoint between the third microphone and the one of the first and the second microphones.

15. The method according to claim 14, wherein each of the multiple surfaces is one of a plane and a right circular conical surface.

16. The method according to claim 15, wherein each plane is orthogonal to a straight line going through the first and the second microphones, and wherein a vertex of each right circular conical surface is located at the first midpoint, and an angle of the right circular conical surface correspond to one of the multiple main time delays.

17. The method according to claim 14, further comprising:

in an offline phase prior to a training phase, randomly generating Z sound sources with known coordinates in a three-dimensional (3D) space; and classifying the Z sound sources as z1 target sound sources inside the TBA and z2 cancel sound sources inside a cancel beam area, where z1+2=Z, and each of z1, z2 and Z is greater than or equal to 0;

wherein the cancel beam area is out of the TBA in the 3D space.

18. The method according to claim 17, further comprising:

in the offline phase, transforming single-microphone noise-free speech audio data and single-microphone noise audio data into mixed Q-microphone augmented audio data according to the coordinates of the z1 target sound sources, the z2 cancel sound sources and the Q microphones by a known acoustic simulation tool; and transforming the single-microphone noise-free speech audio data and the single-microphone noise audio data into resultant audio data according to the coordinates of the Q microphones and the z1 target sound sources by the known acoustic simulation tool.

19. The method according to claim 18, further comprising:

in the training phase, training the trained model with multiple training examples, each training example comprising training input data and training output data, wherein the training input data and the training output data are respectively selected from the mixed Q-microphone augmented audio data and the resultant audio data.

20. The method according to claim 17, wherein the step of classifying comprises:

calculating a main time delay for a sound source selected from the Z sound sources according to a difference of two propagation times of sound from the selected sound source to the first and the second microphones;

defining the selected sound source as a cancel sound source when the main time delay for the selected sound source falls out of the main time delay range;

when the main time delay for the selected sound source falls within the main time delay range, calculating coordinates of an intersection point of the arc line and one of the surfaces corresponding to the main time delay, calculating an outer time delay for the intersection point according to a difference of two propagation times of sound from the intersection point to the third microphone and the one of the first and the second microphones, and calculating an AUX time delay for the selected sound source according to a difference of two propagation times of sound from the selected sound source to the third microphone and the one of the first and the second microphones; and when the AUX time delay for the selected sound source falls out of an AUX time delay range of a core time delay to the outer time delay, defining the selected sound source as a cancel sound source, otherwise defining the selected sound source as a target sound source;

wherein the core time delay is related to a three-dimensional (3D) distance between the third microphone and the one of the first and the second microphones.

21. The method according to claim 14, wherein the step of performing the spatial filtering further comprises:

performing the spatial filtering and a denoising operation over the Q audio signals using the trained model based on the arc line, the main time delay range and the coordinates of the Q microphones to generate a noise-fee beamformed output signal originated from the zero or more target sound sources.

22. The method according to claim 14, further comprising:

extracting a feature vector from Q spectral representations of the Q audio signals prior to the step of performing the spatial filtering;

wherein the step of performing the spatial filtering further comprises:

performing the spatial filtering over the feature vector for the Q audio signals using the trained model based on the arc line, the main time delay range and the coordinates of the Q microphones to generate the beamformed output signal;

wherein the feature vector comprises Q magnitude spectrums, Q phase spectrums and R phase-difference spectrums; and wherein the R phase-difference spectrums are related to inner products for R combinations of two phase spectrums out of the Q phase spectrums.

* * * * *